(12) United States Patent
Rafiee Alavi et al.

(10) Patent No.: US 11,012,163 B1
(45) Date of Patent: May 18, 2021

(54) APPARATUS AND METHODS FOR FAST AND ACCURATE NEAR-FIELD MEASUREMENT

(71) Applicant: THE GOVERNORS OF THE UNIVERSITY OF ALBERTA, Edmonton (CA)

(72) Inventors: Rezvan Rafiee Alavi, Edmonton (CA); Rashid Mirzavand Boroujeni, Edmonton (CA); Pedram Mousavi, Edmonton (CA)

(73) Assignee: THE GOVERNORS OF THE UNIVERSITY OF ALBERTA, Edmonton (CA)

( * ) Notice: Subject to any disclaimer, the term of this patent is extended or adjusted under 35 U.S.C. 154(b) by 0 days.

(21) Appl. No.: 16/813,008

(22) Filed: Mar. 9, 2020

Related U.S. Application Data

(60) Provisional application No. 62/815,828, filed on Mar. 8, 2019.

(51) Int. Cl.
| | |
|---|---|
| *H04B 17/00* | (2015.01) |
| *H04B 17/12* | (2015.01) |
| *H04B 17/345* | (2015.01) |
| *H04B 5/00* | (2006.01) |

(52) U.S. Cl.
CPC .......... *H04B 17/12* (2015.01); *H04B 5/0043* (2013.01); *H04B 17/0085* (2013.01); *H04B 17/345* (2015.01)

(58) Field of Classification Search
CPC ..... H04W 24/06; H04W 24/08; H04W 24/10; H04W 24/02; H04W 24/04; H04B 17/12; H04B 17/345; H04B 7/00; H04B 5/0043; H04B 17/0085
See application file for complete search history.

(56) References Cited

U.S. PATENT DOCUMENTS

| | | | | |
|---|---|---|---|---|
| 6,570,539 | B1* | 5/2003 | Snow | G01R 29/10 342/165 |
| 7,154,283 | B1* | 12/2006 | Weakley | G01R 29/08 324/756.01 |
| 8,643,538 | B2* | 2/2014 | Schantz | G01S 5/14 342/125 |
| 2013/0203377 | A1* | 8/2013 | Nagata | H04W 64/00 455/405 |
| 2014/0155098 | A1* | 6/2014 | Markham | H04B 5/0081 455/456.3 |

(Continued)

*Primary Examiner* — Kathy W Wang-Hurst
*Assistant Examiner* — Max Mathew
(74) *Attorney, Agent, or Firm* — Anglehart et al.

(57) ABSTRACT

A computer-implemented method for adaptive near-field data acquisition during a sampling process; it includes measuring at least one of an amplitude and phase of a field using one or more probes, wherein the measuring is performed at a plurality of points; selecting, for each point of the plurality of points, a set of neighboring points; calculating a field variation to determine the presence of a strongly varying near-field pattern; for each location corresponding to each point of the plurality of points where a varying near-field pattern is determined after the calculating of the field variation, inserting one or more new points; and for each of said one or more new points, calculating a field variation to obtain a higher near-field resolution for said each location where a near-field variation is determined.

20 Claims, 20 Drawing Sheets

(56) References Cited

U.S. PATENT DOCUMENTS

| | | | | |
|---|---|---|---|---|
| 2016/0299201 A1* | 10/2016 | Gunawan | ............. | G01R 33/072 |
| 2018/0056800 A1* | 3/2018 | Meichle | ................. | B60L 53/62 |
| 2019/0018055 A1* | 1/2019 | Li | ......................... | G01R 1/025 |
| 2020/0200794 A1* | 6/2020 | Niles | ................. | G01R 13/0218 |
| 2020/0389285 A1* | 12/2020 | Nuimura | ................ | G01R 29/10 |

* cited by examiner

APPARATUS AND METHODS FOR FAST AND ACCURATE NEAR-FIELD MEASUREMENT

The present application claims priority from U.S. provisional patent application No. 62/815,828 filed on Mar. 8, 2019, incorporated herein by reference.

TECHNICAL FIELD

The present disclosure relates to the field of electric and magnetic field measurements for electronic device testing, and more particularly to near-field and far-field measurements.

BACKGROUND

The main drawback of the near-field measurement is the required time to scan the Device Under Test (DUT), that may be or may include one or more Antennas Under Test (AUT), with a sufficient resolution to acquire all significant features, especially when the information at different frequencies is needed. The traditional way to measure is to uniformly sample the data on a plane-rectangular grid where the sampling space is small compared to the wavelength, i.e. $\lambda$, to capture all details. To prevent the risk, regularly, the near-fields are measured in much more points than what is required.

A few methods are presented to avoid large sampling issue. In [2], the sampling resolution is not constant and, especially, the scanning distance increases and exceeds $\lambda/2$ by moving away from the measurement area. In [2] and [3], plane-polar and bi-polar scanning techniques are applied to reduce the burden of the near-field acquisition. In [4], the sampling starts from the center of the measurement plane and steps outward. The difference between the measured and extrapolated data over a loop, that encloses the scanned area, determines whether more sample points inside the loop is required or not. In [5], this algorithm is extended to spherical and cylindrical near-field antenna measurements. In [6] two measurement schemes, rectangular spiral and adaptive rectangular loop, are proposed. In the first algorithm, measurement starts at the center of the AUT aperture and proceeds outward, and since the required time to calculate the far-field is negligible compared to that of the data acquisition, the far-field accuracy is used as a criterion to terminate the near-field measurement. In the second algorithm, the area of the measurement is elongated in the direction of the maximum power by appending two rows or columns of data. All these methods still need a significant number of measurement samples.

Utilizing a fast electronically switched probe array can remarkably decrease the time of the measurement. For instance, RFxpert [7], is a real-time antenna measurement device that measures the tangential components of AUT near-fields in two orthogonal directions using equally distanced 40×40 magnetic probes. However, there are still some issues about such measurement tool.

SUMMARY

It has been discovered that using an adaptive algorithm to sequentially focus on the strongly changing near-field regions and introducing more samples (data points) in such areas, while skipping data points for smoothly varying locations, allows a significant decrease in scanning time, which is a highly desired improvement in numerous application. The adaptative algorithm introduces a batch of N locations, in every step, in order to add their near-field values. Since the newly added points are not necessarily laid on the probe locations, an appropriate interpolation technique is employed to estimate the value of the fields at these points. Compared to [8] and [9], in strongly varying locations every single square cell is divided into four equal cells instead of Voronoi Tessellations because of two reasons; (i) The configuration of the probes in the used probe array is a uniform Cartesian grid, and (ii) with rectangular gridding, the interpolating and processing the data is very simple and efficient from the analytical and computational viewpoints. Yet, generally, the Voronoi Tessellations can be also used for partitioning the measurement surface, especially in the case of nonuniform sampling.

However, when used for the measurement using a single probe or a couple of magnetic and electric probes, the adaptative algorithm may not decrease the scanning time considerably, due to the fact that the new locations, at which the fields must be measured, are randomly distributed and the scanning probes must move large distances. In such cases, a greedy algorithmic approach, that simply considers the remaining locations, may be employed and, based on that, the probes are moved to the closest location [10].

Otherwise, the adaptative algorithm needs remarkably fewer number of samples to reach the same accuracy as other prior art methods. In case of very fast high-resolution probe array measurements, the natural neighbor interpolation is used to compute the data at the required locations, that are determined using the adaptive algorithm, and are not necessarily laid on the probe positions, such as to get rid of redundant samples. This approach helps to have a fast back projection in source reconstruction-based techniques, which are the most accurate approaches for antenna and Printed Circuit Board (PCB) characterization. The validity of the approach is verified using numerical and measurement results.

It has been further discovered that the two problems of the probe array measurement regarding the averaging and Plane Wave Spectrum (PWS) techniques are solved when using the adaptive algorithm, sequentially obtaining the near-field data at the required locations by having the measured uniform data using a probe array. Further improvements may also be had when using advanced interpolation methods such as linear, nearest, and natural neighbor to model the field for different SNR values. Additionally, a Source Reconstruction Method (SRM) may be used to increase measurement accuracy, by calculating the equivalent currents over a fictitious surface that encloses the Device Under Test (DUT) and the far-field pattern of the antenna.

A broad aspect is a computer-implemented method for adaptive near-field data acquisition. The method incudes measuring at least one of an amplitude and phase of at least one of a magnetic field and an electric field over a surface using one or more probes, wherein the measuring is performed at a plurality of points at one or more predetermined heights and a plurality of locations in proximity to a device under test, wherein each point corresponds to a predefined area, and wherein all of the predefined areas define the measurement plane; selecting, for each point of the plurality of points, a set of neighboring points; in order to obtain an initial near-field data resolution, for each point of the plurality of points using the set of neighboring points for the each point, calculating a field variation to determine a presence of a strongly varying near-field pattern; for each location corresponding to each point of the plurality of points where a strongly varying near-field pattern is determined, inserting one or more new points, wherein each point of the one or more new points corresponds to a predefined sub-area, and wherein all of the predefined sub-areas define the each location where a near-field variation is determined; and for each of the one or more new points, calculating a field variation to determine a presence of strongly varying near-field pattern, providing increased near-field resolution for the each location.

The calculating and the inserting may be repeated until no more strongly varying near-field patterns are determined.

In some embodiments, the one or more probes may be an array of probes.

In some embodiments, each point of the plurality of points may be at a center of the corresponding predefined area.

In some embodiments, the predefined area may have a rectangular shape.

In some embodiments, the predefined area may be curved.

In some embodiments, the predefined area may have a polygonal shape, such as a triangular, pentagonal, hexagonal shape.

In some embodiments, the method may be repeated over a plurality of parallel measurement planes.

In some embodiments, the plurality of points may define a plane in proximity to a surface of the device under test.

In some embodiments, the method may be repeated over a plurality of non-parallel measurement planes.

In some embodiments, Voroni Tessellations may be used to generate the predefined areas as a function of the surface.

In some embodiments, the surface may be curved.

In some embodiments, the adaptive near-field data acquisition may be used to evaluate or calibrate a device under test.

In some embodiments, the device under test may include an antenna, and wherein the adaptive near-field data acquisition may be used to calculate one or more parameters of the antenna, wherein the parameters consist of gain and directivity.

In some embodiments, the measuring may include the measuring of the amplitude of the at least one of the magnetic field and the electric field.

In some embodiments, the method may include, after the calculating for each of the new points, verifying a convergence of the measured near-field data, and terminating the sampling process following the verifying.

In some embodiments, the selecting a set of neighboring points may be performed using N-dimensional cross-polytope configuration.

In some embodiments, the calculating a field variation may include calculating power variation of the at least one of a magnetic field and an electric field.

In some embodiments, the calculating a field variation may include calculating at least one of amplitude and phase variation of the at least one of a magnetic field and an electric field.

In some embodiments, the method may include performing a spectral-spatial scan of a device under test using the near-field data.

In some embodiments, the one or more probes may be inserted in a dielectric.

Another broad aspect is a device that has been tested using the near-field data generated using the method as described herein.

In some embodiments, the device may include an antenna.

Another broad aspect is non-transitory memory including program code that, when executed by a processor, causes the processor to measure at least one of an amplitude and phase of at least one of a magnetic field and an electric field over a surface using one or more probes, wherein the measuring is performed at a plurality of points at one or more predetermined heights and a plurality of locations in proximity to a device under test, wherein each point corresponds to a predefined area, and wherein all of the predefined areas define the measurement plane; select, for each point of the plurality of points, a set of neighboring points; in order to obtain an initial near-field data resolution, for each point of the plurality of points using said set of neighboring points for said each point, calculate a field variation to determine a presence of a strongly varying near-field pattern; for each location corresponding to each point of the plurality of points where a strongly varying near-field pattern is determined, insert one or more new points, wherein each point of said one or more new points corresponds to a predefined sub-area, and wherein all of the predefined sub-areas define said each location where a near-field variation is determined; and for each of said one or more new points, calculate a field variation to determine a presence of strongly varying near-field pattern, providing increased near-field resolution for said each location.

Another broad aspect is a device testing chamber system including one or more probes that are at least one of magnetic or electric; a chamber for receiving a device under test; a processor; and the non-transitory memory as described herein.

In some embodiments, the memory may further contain program code that, when executed by the processor, causes the processor to remove disruption caused by at least one of the chamber and a disruptive object from the acquired near-field data.

In some embodiments, the near-field data may be acquired at multiple frequencies, in a frequency band, and/or at various times to support DUT with modulated data or to reduce the error of final results.

A computer-implemented method for adaptive near-field (NF) data acquisition, comprising the steps of:
a) the measurement is performed using a magnetic and electric probe over a planar surface to measure the amplitude and phase of the magnetic and electric fields;
b) the proposed method starts with a small number of initial scan data points that are distributed uniformly across the measurement plane;
c) to evaluate the density of data points, the measurement area is divided into square cells that each data point is at the center of a square;
d) to localize the areas with a strongly varying near-field pattern, for each data point, a set of neighboring data points are chosen. These neighbors are located at the center of the rectangles that have any overlap with the cell of the point. These neighbors are used to calculate the field variation around the above data point;

the adaptive algorithm sequentially focuses on the strongly changing near-field regions and inserts more samples in such areas;

at the location which have maximum field variation, a new data point is inserted;

after adding every data point, the convergence of the measured near-field data is checked to automatically terminate the sampling process;

The aforementioned algorithm wherein the measurements are performed over a couple of parallel planar surface at the same or different heights, where the height can be changed by changing the position of the DUT relative to the planar surface or changing the position of the planar surface relative to the DUT;

A computer-implemented method for adaptive near-field (NF) data acquisition, comprising the steps of:
(a) the measurement is performed using a couple of magnetic and electric probe over any surface such as cylindrical or spherical surfaces to measure the amplitude and phase of the magnetic and electric fields;
(b) the proposed method starts with a small number of initial scan data points that are distributed uniformly over the measurement surface such that each probe scans a part of the surface;
(c) to evaluate the density of data points, the measurement area is divided into square cells that each data point is at the center of a square cell;
(d) to localize the areas with a strongly varying near-field pattern, for each data point, a set of neighboring data points are chosen. These neighbors are located at the center of the square cells that have any overlap with the cell of the point. These neighbors are used to calculate the field variation around the above data point;
(e) the adaptive algorithm sequentially focuses on the strongly changing near-field regions and inserts more samples in such areas;
(f) in every step, a batch of N data points is inserted to the near-field values;
(g) every probe just scans the fields at the data points that are laid in the part of the surface that is related to the probe;
(h) after adding every data point, the convergence of the measured near-field data is checked to automatically terminate the sampling process;

The algorithm wherein the fields measured and recorded using different probes simultaneously;

The algorithm wherein the fields measured using different probes one by one;

The algorithm wherein the measurements are performed over a couple of different surfaces at the same or different distances from the DUT, where the distance can be changed by changing the position of the DUT relative to the surfaces or changing the position of the surfaces relative to the DUT;

A computer-implemented method for adaptive near-field (NF) data acquisition, comprising the steps of:
(a) the measurement is performed using uniformly distributed magnetic and electric probes over a planar surface to measure the amplitude and phase of the magnetic and electric fields;
(b) the proposed method starts with a small number of initial data points that are distributed uniformly across the measurement plane and are exactly at the location of the some of the uniformly distributed probes;
(c) to evaluate the density of data points, the measurement area is divided into square cells, and each data point is at the center of a square;
(d) to localize the areas with a strongly varying near-field pattern, for each point, a set of neighboring points are chosen. These neighbors are located at the center of the rectangles that have any overlap with the cell of the point. These neighbors are used to calculate the field variation around the above point;
(e) the adaptive algorithm sequentially focuses on the strongly changing near-field regions inserts more samples in such areas;
(f) in every step, a batch of N data points is inserted to the near-field values;
(g) Since the newly inserted data points are not necessarily laid on the probe locations, the natural neighbor interpolation technique is employed to estimate the value of the fields at these data points;
(h) after adding every batch of new data points, the convergence of the measured near-field data is checked to automatically terminate the sampling process;

The algorithm wherein the probes are embedded in a dielectric at predetermined locations;

The algorithm wherein the probes are distributed nonuniformly;

The algorithm wherein the radiation pattern of the probe antenna is used for full or partial probe correction;

The algorithm wherein an absorber or any technique such as matrix pencil method is used to decrease or remove the interaction between the AUT and probe;

The aforementioned algorithm wherein the reflections from the objects that absorb electromagnetic fields (i.e. absorbers, such as magnetically loaded rubber or dielectric foam with high dielectric loss) or objects that scatter electromagnetic fields (i.e. scatterers: such as metallic or carbonic objects) in the chamber are considered as coefficients to modify the near-field data;

The aforementioned algorithm wherein the near-field data is modulated;

The algorithm wherein Voroni Tessellations are used for partitioning the planar surface;

The algorithm wherein any method such as utilizing the N-dimensional cross-polytope configuration is used to determine the neighboring data points;

The algorithm wherein any criterion such as the difference between the amplitude of the measured near-field and its local linear approximation is used to estimate the field variation;

The algorithm wherein the power variation is used to determine the strongly changing near-field regions;

The algorithm wherein in every step a batch of N data points are inserted;

The algorithm wherein after adding every batch of data points, the convergence of the measured near-field data is checked to automatically terminate the sampling process;

The algorithm wherein a greedy algorithmic approach is employed that simply considers the remaining locations of the data points that are determined to be inserted, and based on that, the probe is moved to the closest location to the current location of the probe;

The algorithm wherein the measurement is performed over any surface such as cylindrical and spherical surfaces;

The algorithm wherein once the samples of the near-field are obtained, a source reconstruction method is applied to reconstruct the currents on the surface that encloses the antenna or device under test (DUT), and thereafter the far-field (FF) pattern of the antenna using a NF-FF transformation algorithm;

The algorithm wherein NF-FF transformation algorithms rather than source reconstruction methods such as plane wave spectrum (PWS) are used to calculate the far-field;

The algorithm wherein the near-field data is used to calculate parameters of antenna such as gain, directivity, etc. rather than the far-field pattern;

The algorithm wherein the near-field data is used to create a spectral-spatial scan for the DUT;

The algorithm wherein the near-field data is used for EMC/EMI diagnostic tests;

The algorithm wherein the near-field data is used for measuring TX/RX performance of RF and microwave transceivers;

The algorithm wherein the algorithm is used for measuring TX/RX performance of MIMO systems;

The algorithm wherein only the amplitude of the electric and magnetic field is measured;

The algorithm wherein only a magnetic probe is used to measure the amplitude and phase of the magnetic field;

The algorithm wherein only the amplitude of the magnetic field is measured;

The algorithm wherein only an electric probe is used to measure the amplitude and phase of the electric field; and The algorithm wherein only the amplitude of the electric field is measured.

BRIEF DESCRIPTION OF THE DRAWINGS

The invention will be better understood by way of the following detailed description of embodiments of the invention with reference to the appended drawings, in which.

DETAILED DESCRIPTION

Figure 1:
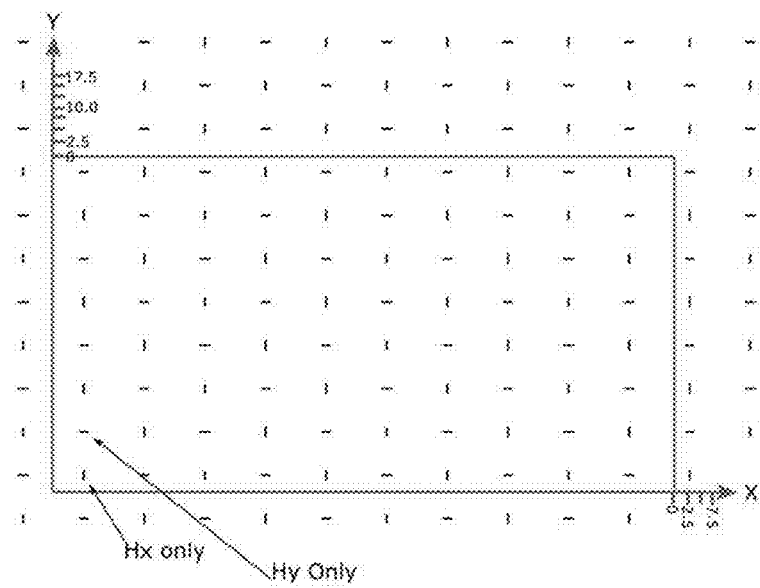
FIG. 1 illustrates a set of equally spaced magnetic probes in X and Y directions as an exemplary probe array which collects power of magnetic fields with a high resolution.

The present disclosure relates to methods and devices for obtaining, information (e.g. for the purposes of testing or diagnosis) on devices with wireless transmission and/or receiving elements, such as computers, smartphones, circuit boards, etc. (i.e. a device under test). For example, the method can be used to test the performance of NFC, Bluetooth, Wi-Fi, or Data communication antennas in a device (e.g. smartphone), or to evaluate the Wi-Fi antenna in a laptop, or diagnose a device such as a microwave circuit with some radiation fields. The device under test may include one or more transmission and/or reception elements such as an antenna. More particularly, the present disclosure relates to obtaining near-field data by performing near-field testing (a non-destructive electromagnetic technique) for the purpose of, e.g., testing and/or diagnosis. The improvements disclosed herein for collecting data during near-field testing result in an improved method that takes less time and requires less resources than techniques that are currently known in the art.

The method involves performing a first lower resolution test to calculate field variation. Then, following an analysis of the field variation at the first lower resolution, points or areas where a strong varying near-field pattern are identified. A second, higher resolution test (e.g. additional data points covering smaller areas are added, or subdividing the area associated with the strong varying near-field pattern into a plurality of smaller subareas) is performed for those areas where the strong varying near-field pattern is identified. As such, the present method avoids the requirement of conducting a higher resolution test across, e.g., an entire sampling to be tested (determining points with respect to the device under test), where only areas where a strong varying near-field pattern are detected are further analyzed at a higher resolution, saving time when performing the process. It has been shown, as described herein, that such a technique achieves a similar if not same level of accuracy as the techniques that involve a higher resolution testing across the entirety of the sample, despite the time saved by analyzing a reduced amount of data points.

In the present disclosure, by "resolution", it is meant the number of data points analyzed over a given sampling (e.g. surface area). The more data points analyzed for a given sampling (e.g. surface area), the greater the resolution.

The adaptative algorithm presented in this application is a significant improvement over the work of references [8] and [9], where a simple sequential sampling, along with a modeling method for the near-field analysis of electronic circuits, are described. To obtain a robust sequential sampling, a tradeoff between two important criteria, 'exploration' (Voronoi Tessellations) and 'exploitation' (local linear approximations) is fulfilled.

The sampling technique minimizes the required number of samples to have enough near-field details for a given accuracy. Moreover, after adding every new sample point, the convergence of the measured near-field data is checked to automatically terminate the sampling process. As shown in [8] and [9], the total number of required samples is decreased significantly compared to the classical uniform sampling for the same quality of the results such that, for instance, the required number of samples is in the range of 10 percent of the number of samples in uniform sampling. Once additional near-field data samples are obtained, Kringing approximation model is computed to model the sampled near-field pattern [9].

A probe is an electromagnetic element that converts magnetic and/or electric fields to currents which can be measure by equipment such as vector network analyzer (VNA), spectrum analyzer, oscilloscope, or power meter. The probe may be one, more than one, or a combination of small loop antennas and small dipole antennas to measure electric and/or magnetic fields in one, two, or three directions.

A combination of probes can result in a probe array to measure electric and/or magnetic fields in various places without movement of the probes or the device under test. Since the distance between two adjacent probes in a probe array is fixed (e.g. 10 mm for the exemplary probe array shown in FIG. 1), to achieve a resolution of 2 mm, the sample device under test may be moved up a total of 10 times and sideways a total of 5 times, for 50 total measurement. For example, the first position is (0,0). The second position is up 2 mm. For the first 10 measurements, the board is moved up each time. Then the sample is shifted 2 mm to the right and all 10 upward measurements are repeated. 10 upward measurements must be done because the probes measure only one polarization. In the probe array software, the data is averaged as it mentioned to fill in the missing data. The interpolated data must be discarded, and the final 5 measurements of an upward sweep are used to fill in the values of the missing polarization. This process may not be sufficiently fast and accurate to accommodate a desired DUT throughput. Instead of moving the DUT over the scanner by a user, to obtain high resolution data, probes may be moved electronically for an acceptable sampling resolution. This leads to a faster and more accurate data collection scheme.

This application addresses and improves on two issues from the methods found in the prior art. Firstly, each probe only measures one polarization of the field and because of physical confinement, at every point one probe can be fabricated. Thus, at the location of each probe, one component of the magnetic field may be measured and the other one may be estimated by having the fields measured at four surrounding probes. In the prior art, a simple averaging technique is used to estimate the value of the field. In this application, more advanced interpolation methods, such as linear, nearest, and natural neighbor, are used to model the field for different SNR values, such that results, which may be as accurate, are achieved with less data points.

Secondly, the algorithm used for near-field far-field transformation in prior art, plane wave spectrum (PWS), is based on the modal expansion method. As it is stated in [7], the drawback of this method is that the size of the scanning and source plane, the separation distance between them, and the extent to which we may ignore the evanescent waves may affect the accuracy of the PWS method.

In the PWS method, the radiated fields of the AUT are expanded in terms of planar wave functions. The measured near-fields are used to compute the unknown expansion coefficients. Thereafter, the expanded modes are utilized to calculate the far-field pattern. The advantage of the PWS method is that, for sinusoidal modes, the classical Fast Fourier transform may be used to calculate the expansion coefficients. Thus, this method is a proper choice for real-time application.

An alternative technique, to have a better accuracy, is the source reconstruction method (SRM), which uses the measured near-field data to reconstruct equivalent currents over a fictitious surface that encloses the AUT. The SRM methods are less sensitive to measurement distortions and noise compared to PWS based techniques. On the other hand, the process time of the SRM method is higher than that of the PWS technique. However, by decreasing the number of samples, done by removing redundant samples from the measured data, the speed of the algorithm may be significantly improved.

1. Uniform Sampling, Interpolation Techniques and Source Reconstruction Method (SRM)

The near-field measurements of the exemplary embodiments presented herein may be performed using an RFxpert device, which is an electronically switched probe array. Someone skilled in the art would appreciate that the algorithms presented here can be extended to any configuration of probes, single or multiple probes, either embedded in a dielectric or not, and distributed or moved over different surfaces, for instance, spherical or cylindrical. The RFxpert is an array of 40×40 magnetic uniformly distributed probes with a sampling resolution of 1 cm.

Figure 2:
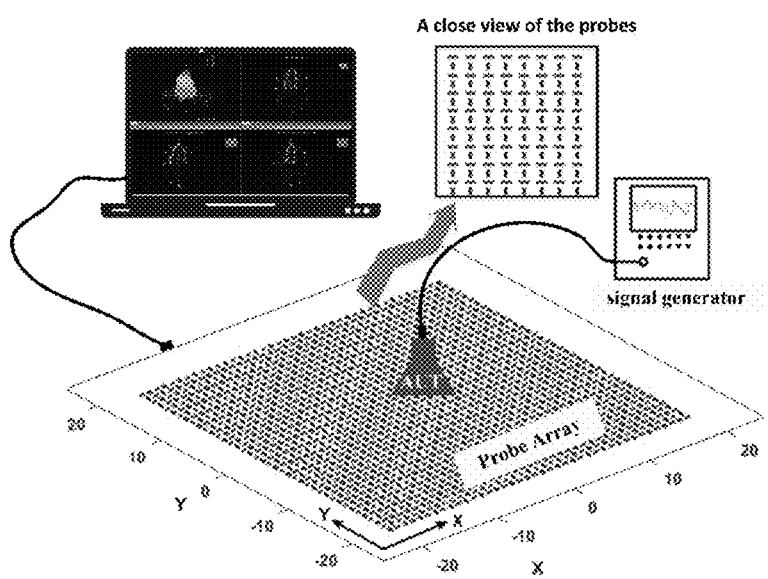
FIG. 2 illustrates an exemplary test setup including a computer connected to the probe array, a probe array with probe orientation of an RFxpert probe array and an Antenna Under Test connected to a signal generator.

A simple schematic of the probes orientation for this planar near field measurement tool is depicted in FIG. 2. Because of physical limitations, each point only measures one component of the magnetic field, in the X or Y directions, as shown in FIG. 2. The simple averaging technique may be used to calculate the complementary components. To investigate the accuracy of the simple averaging scheme the value of the missing components may be compared with values obtained from other interpolation techniques, such as the linear, nearest and, natural neighbor interpolation methods.

Having a data set, the different interpolation techniques may be utilized to estimate the function values at an unsampled location, between precisely known data points. For interpolation techniques, the assumption is that data points are exact and the interpolant curve or surface has to pass through all data points, and are valid only between the samples, as described in [11] and [12]. Moreover, for an ideal interpolation technique, the interpolant and its derivative are continuous.

The nearest neighbor is not strictly speaking an interpolation method, as the value of a function at any location is assumed to be equal to the function of the nearest known sample. However, the method is local and easy to implement, although discontinuous at the boundaries (as presented in [11] and [12]).

The linear interpolation is based on a triangulation of the data points. The weights are the distances of the point from the vertices of the triangle. The method is local and exact, but this method also is also not continuous at the boundaries, [11] and [12].

The natural interpolation method is based on the Voroni diagram, both for selecting the data points and for assigning the weights. The weights are determined by finding how much of each of the surrounding areas is shared with the other cells when a new point is inserted to the tessellation. The interpolant is local, exact, and continuous everywhere. The derivative is also continuous except at the data points, [12] and [13].

Once the samples of the near-field are obtained, a near-field to far-field transformation algorithm, such as PWS or source reconstruction method, may be used to calculate the far-field pattern of the AUT and the equivalent currents on the surface that encloses the DUT. In the preferred embodiment, a source reconstruction method is applied to reconstruct the currents on the surface of the volume that encloses the AUT. The tangential components of the magnetic field (amplitude and phase), parallel to the planar AUT, are measured on the scanning plane ($\Sigma_M$). This measured data is linked to the equivalent electric, $\vec{J}$, and magnetic, $\vec{M}$, sources on the reconstruction surface ($\Sigma_R$) via EFIE, [7] and [14], as:

$$\vec{H} = \mathcal{K}(\vec{J}, \vec{r}) - \frac{1}{\eta_0}\mathcal{L}(\vec{M}, \vec{r}) \tag{1}$$

$$\mathcal{K}(\vec{J}; \vec{r}) = \int_{\Sigma_R} \vec{J}(\vec{r}') \times \nabla g(\vec{r}, \vec{r}') dS'$$

$$\mathcal{L}(\vec{M}, \vec{r}) = jk_0 \int_{\Sigma_R} \left[M(\vec{r}') + \frac{1}{k_0^2}\nabla\nabla'_s \cdot M(\vec{r}')\right] g(\vec{r}, \vec{r}') dS'$$

$$g(\vec{r}, \vec{r}') = e^{-jk_0|\vec{r}-\vec{r}'|}/4\pi k_0|\vec{r}-\vec{r}'| \tag{2}$$

where $\eta_0 = \sqrt{\mu_0/\varepsilon_0}$, $k_0 = \omega\sqrt{\mu_0\varepsilon_0}$ and $\nabla'_s$ is the surface divergence operator. The reconstruction surface is discretized to flat triangular patches. Rao-Wilton-Glisson (RWG) basis functions ($F_n$) are used to represent electric and magnetic currents:

$$\vec{J} = \sum_{n=1}^{N} c_n^J F_n, \vec{M} = \eta_0 \sum_{n=1}^{N} c_n^M F_n \tag{3}$$

where $c_n$s are the unknown coefficients. Using the Method of Moment (MoM) to solve these integral equations numerically, we have the following linear system:

$$\eta_0 [\mathcal{K}_{MR}\mathcal{L}_{MR}]\begin{bmatrix}c^J \\ c^M\end{bmatrix} = [\vec{H}] \tag{4}$$

while $\vec{H}$ indicates the tangential magnetic field components on $\Sigma_M$. The equation (4) may be rewritten in a compact form as:

$$AX=\vec{H} \tag{5}$$

where A is the impedance matric and X is the vector of the unknown magnetic and electric current coefficients [7]. For most source reconstruction problems, the matrix A is ill-conditioned. Here, (5) is solved by the Tikhonov regularization method. The cost function may be defined as:

$$\|\vec{H}-AX\|^2+\alpha^2\|X\|^2 \tag{6}$$

where $\|.\|$ indicates the Euclidian norm and a is the regularization parameter that is determined by L-curve method [7].

2. Noise Modeling

Each magnetic probe may be a magnetic loop connected to a microwave power detector. A microwave power detector may be a diode used in its quadratic region. In this region, the output voltage is proportional to the input power [15]. In other words, the diode turns the input power, P, to a DC voltage, $v_d$ $$v_d=k_d P \tag{7}$$

Assuming a microwave sinusoidal voltage, such that:

$$v(t)=V_0[1+\alpha(t)]\cos[\omega_0 t+\varphi(t)] \tag{8}$$

where $\alpha(t)$ and $\varphi(t)$ are respectively the partial amplitude and phase oscillations, in low noise condition, ($\alpha(t)\ll 1$), the power may be represented by:

$$P \approx \frac{V_0}{2R}(1+2\alpha(t)) = P_0 + \delta P \tag{9}$$

A straightforward analysis establishes the following relation between the amplitude and power fluctuations, such that:

$$\alpha(t)=\delta P/2P_0 \tag{10}$$

Using eq. (7), the AC component of the detected voltage is $v_d=k_d\delta P$ which is related to amplitude fluctuations by:

$$v_d=2k_d P_0 \alpha(t) \tag{111}$$

Turning voltages into spectra:

$$S_v(f)=4k_d^2 P_0^2 S_\alpha(f) \tag{12}$$

Figure 3:
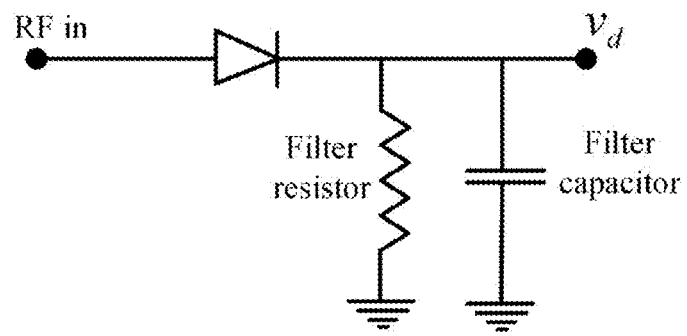
FIG. 3 is a schematic drawing of a microwave power detector circuit showing the RF signal passing through a diode and having a filter resistor and capacitor.

In rectifying the RF signal, the diode detector, as shown in FIG. 3, provides an output equivalent to the envelope of the signal, i.e. it acts as an envelope detector. Assuming the signal x(t) is applied to the envelope detector:

$$x(t)=v_{in}(t)+n(t)=[V_{in}+n_I(t)]\cos(2\pi ft)-n_Q\sin(2\pi ft) \tag{13}$$

For which the $v_{out}$ is the envelope of x(t):

$$v_{out}=\{[V_{in}+n_I(t)]^2+n_Q^2(t)\}^{1/2} \quad (14)$$

where n(t) denotes noise, and $n_I$ and $n_Q$ are in-phase and quadrature components of noise. Assuming the power of noise is very low, then:

$$v_{out}=V_{in}+n_I(t) \quad (15)$$

Based on eq. (15) the PSD of the $v_{out}$ noise is similar to the PSD of $V_{in}$ noise. On the other hand, the output of the power detector is a voltage that is related to the magnetic field by a transfer function γ(f), $v_{out}(f)=H(f)/γ(f)$ [16]. Moreover, for the microwave power detectors, the relation between the input power and the output voltage is relatively independent of the frequency (e.g. FIG. 4 in [17]).

Therefore, an equivalent noise component with a PSD, similar to flicker noise, may be added to the magnetic field components (in the simulation) to model the noise. According to (6), there is a linear relation between the reconstructed currents and the measured magnetic field. Thus, using (15) and knowing the noise spectrum of output voltage of the microwave power detector, we can obtain the noise spectrum of the calculated equivalent currents.

3. Adaptive Sampling Algorithm

The proposed adaptive algorithm starts with a small number of initial scan points that are distributed uniformly across the measurement plane. These initial points and the sequentially added points may be used to characterize the overall near-field pattern of the AUT. A balanced tradeoff between two criteria, exploration and exploitation, is required. Exploration means searching the scanning area to locate the main regions that have not spotted yet. The purpose of exploration is to ensure that the points spread over the measurement area evenly, while exploitation is the act of focusing on the areas that are highly dynamic and require finer sampling resolution.

The adaptative method described herein is a balanced combination of both criteria. It starts by computing a small number of initial scan points and most of the data points are added adaptively. For the exploration criterion, the density of the samples is determined by calculating a Cartesian rectangular grid of data points and calculating the area of each cell. For the exploitation, the field variation is quantified by computing the linear approximation of the fields at the data points and comparing the approximated and true values. These two criteria are combined as a metric function to rank the data points according to their dynamic variation of near-field pattern at their locations. The highly ranked points represent the areas that require additional data points. This process continues sequentially until the termination criterion is satisfied.

A. Exploration

Figure 4:
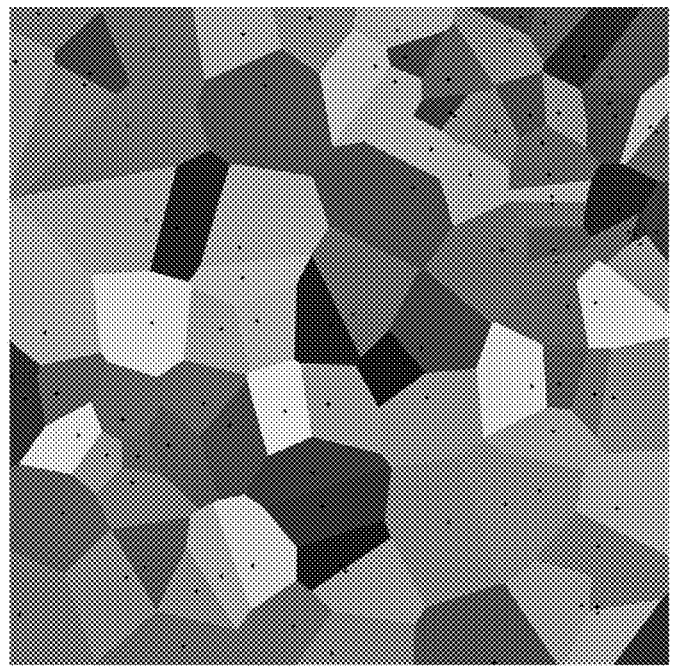
FIG. 4 is an illustration of an exemplary Voroni tessellation.

To evaluate the density of data points, a measurement area may be divided into square cells, where each data point is at the center of a square. Cells with a large area compared to other cells represent the regions that are sampled sparsely. Thus, for each sample point, $p_k$, the volume of the corresponding cell, $A(C_k)$, is compared to the area of the other cells using the following relation [9]

$$V(p_k)=A(C_k)/(A(C_1)+A(C_2)+\ldots+A(C_k)) \quad (16)$$

where $C_k$ indicates the cell that encompasses point $p_k$. $V(p_k)$, which is a number between zero and one, denotes the portion of the scan area that contains point $p_k$. Also, Voronoi Tessellations may be used for partitioning the measurement surface as shown in FIG. 4, especially for nonuniform sampling.

Figure 5:
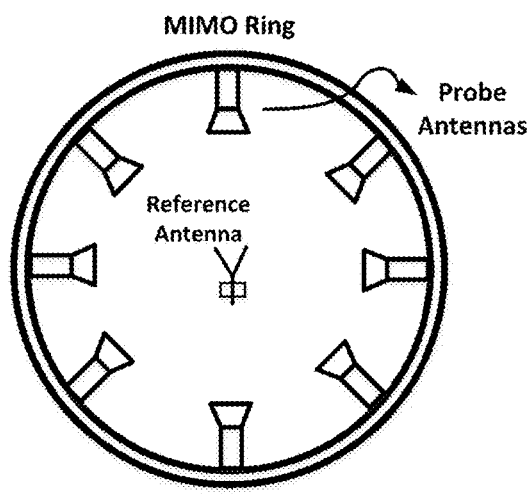
FIG. 5 is a schematic of a setup of the reference antenna measurement in a MIMO ring system, such that a reference antenna is surrounded by probe antennas.

If this algorithm is used for uniform or nonuniform sampling over nonplanar surfaces, for instance for measuring the transmitter (TX) and/or receiver (RX) performance of RF and microwave transceivers and MIMO systems (FIG. 5), square cells or Voronoi Tessellations can be utilized to partition the various measurement surfaces such as cylindrical or spherical surfaces.

B. Exploitation

To localize the areas with a strongly varying near-field pattern, first for each $p_k$, a set of neighboring points, $N(p_k)$ are chosen. These neighbors may be found using a N-dimensional cross-polytope configuration [8]. In the embodiments described herein, the neighbors are chosen with the data points at the center of the rectangles that have at least one common edge or vertex with the cell of $p_k$. These neighbors are used to calculate the gradient $\nabla|H(x,y)|$ $$\nabla|H(x,y)|=(\partial|H(x,y)|/\partial x, \partial|H(x,y)|/\partial y) \quad (17)$$

where $|H(x,y)|$ denotes the amplitude of H(x,y). This gradient characterizes the local linear approximation $\tilde{H}(x,y)$ at $p_k(x_k, y_k)$, as:

$$|\tilde{H}(x,y)|=|H(x,y)|+(\nabla|H(x,y)|)_{p_k}(p-p_k) \quad (18)$$

where p represents the neighboring points of $p_k$. Consider that $(\nabla|H(x,y)|)_{p_k}=F^{-1}b$ is calculated by fitting a hyperplane through point $p_k$, based on its V neighbors $\{p_{k_v}\}_{v=1}^V$, where:

$$F = \begin{bmatrix} x_{k1}-x_k & y_{k1}-y_k \\ x_{k2}-x_k & y_{k2}-y_k \\ \ldots & \ldots \\ x_{kV}-x_k & y_{kV}-y_k \end{bmatrix}$$

$$b = [|H(p_{k_1})| |H(p_{k_2})| \ldots |H(p_{k_V})|]^T$$

Once the local linear approximation of the dynamic behavior of the near-field pattern is calculated using (17), the estimated value of the field at $p_k$ is compared with the true value:

$$\overline{W}(p_k) = \sum_{v=1}^{V} ||\tilde{H}(p_k)|-|H(p_k)|| \quad (19)$$

A high value of $\overline{W}(p_k)$ indicates that the field is varying rapidly in this area. A normalized metric is used to describe the dynamic variation of field near the coordinate $p_k$ to that of the other points [9]:

$$W(p_k)=\overline{W}(p_k)/(\overline{W}(p_1)+\ldots+\overline{W}(p_k)) \quad (20)$$

This algorithm may be implemented for both electric and magnetic fields, and amplitude-only near-field measurements. Moreover, the fields may be measured and recorded using different probes simultaneously or one by one.

C. Adaptive Data Sampling Selection

In the preferred embodiment, a combination of exploration and exploitation criteria may be used as the global metric, $G(p_k)$, to rank the sampled data points [8], such that:

$$G(p_k)=(1+V(p_k))(1+W(p_k)) \quad (21)$$

High value of $G(p_k)$ indicates that the region associated to $p_k$ may be undersampled, and that more data points may be required to be added in this area.

4. Measurement and Simulation Results

Figure 6A:
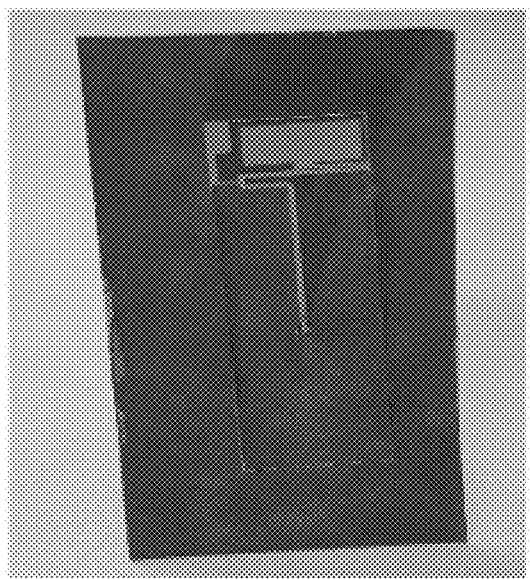
FIG. 6A is a front view of a planar antenna under test.
Figure 6B:
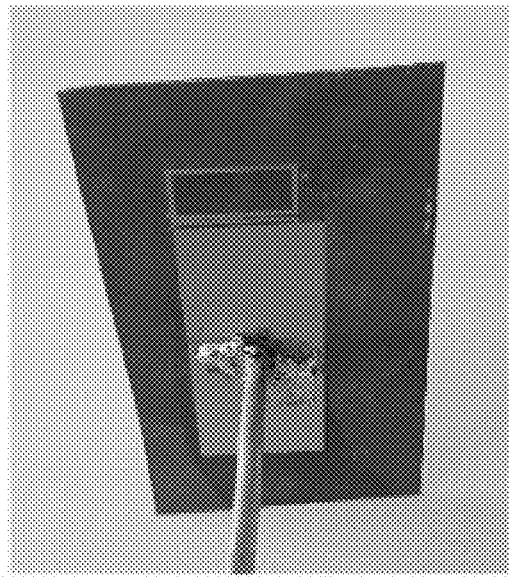
FIG. 6B is a rear view of the planar antenna under test shown in FIG. 6A.
Figure 6C:
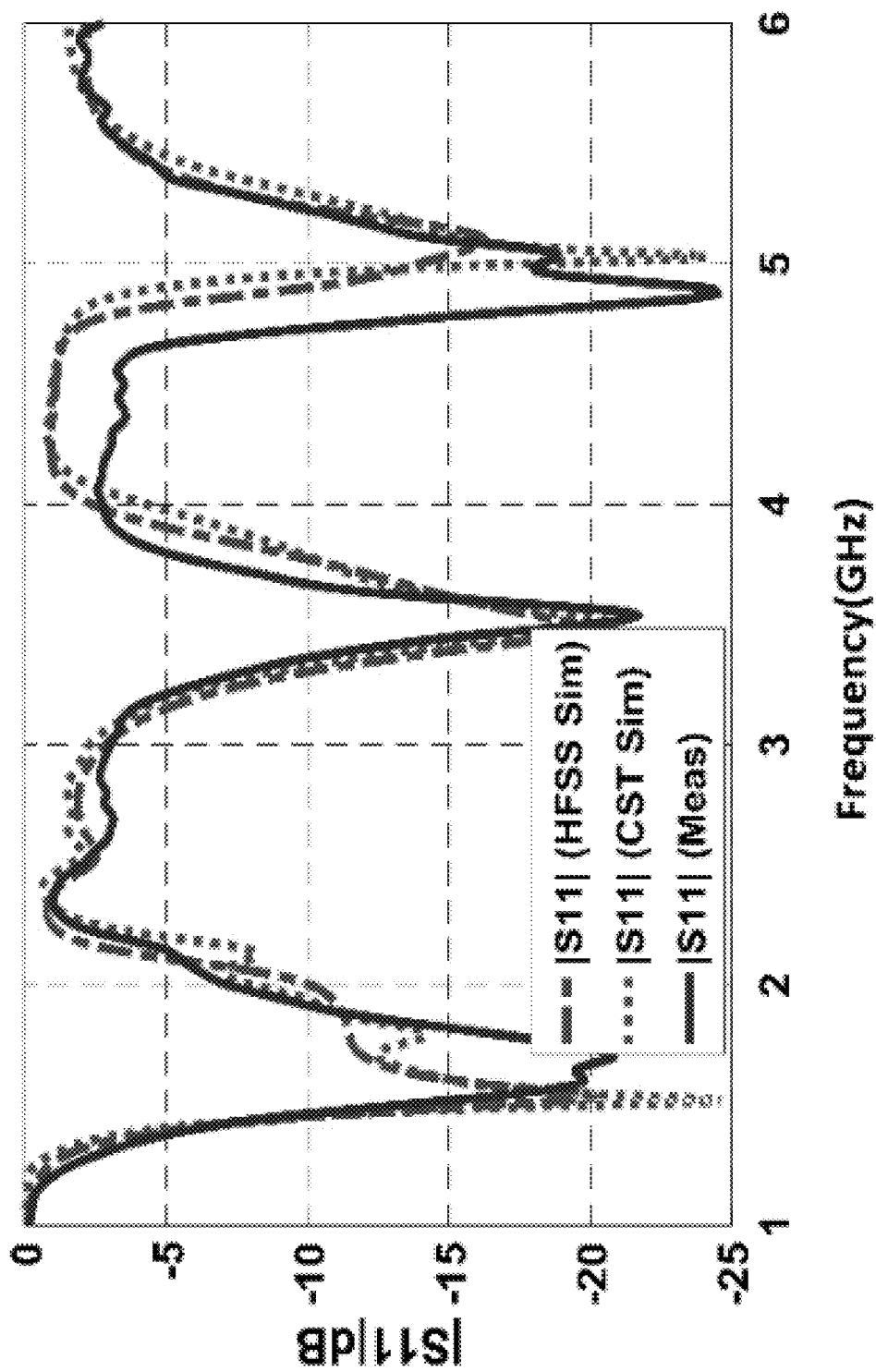
FIG. 6C is a graph illustrating |S11| of the planar antenna simulated using HFSS and CST as a function of frequency in gigahertz.

To evaluate the proposed approach, a multi-band antenna is designed and fabricated to analyze methods in various frequencies. The fabricated AUT and its |S$_{11}$| are shown in FIG. 6A through C. The design process of this antenna is explained in [18]. Since the frequency range of probe array scanner is approximately 1-6 GHz, the near-field of the AUT is measured at 1.5 GHz, 3.5 GHz, and 4.75 GHz in order to evaluate the performance of the interpolation and adaptive sampling techniques.

First, as described herein, as the RFxpert probe array only samples X or Y component at any one point, and the other component is estimated numerically, the performance of the averaging, linear, nearest, and natural neighbor interpolations is evaluated for different levels of noise. As further described herein, the power stability of the detector is confined by the flicker floor, thus the input noise is assumed to be a random data with the same spectral density as flicker noise (S$_{H^N}$(dB/Hz)), as shown in FIG. 7.

The mathematical difficulty with flicker noise is that the integral of power spectral density (PSD) over frequency results in a logarithmic function that diverges at $f=0$ Hz and $f=\infty$. However, it is impossible to measure PSD at $f=0$ Hz and $f=\infty$, since it demands infinite time of observation or infinite frequency of the spectrometer. Thus, in practice, the flicker noise is interpreted in a limited bandwidth (and time).

Figure 7:
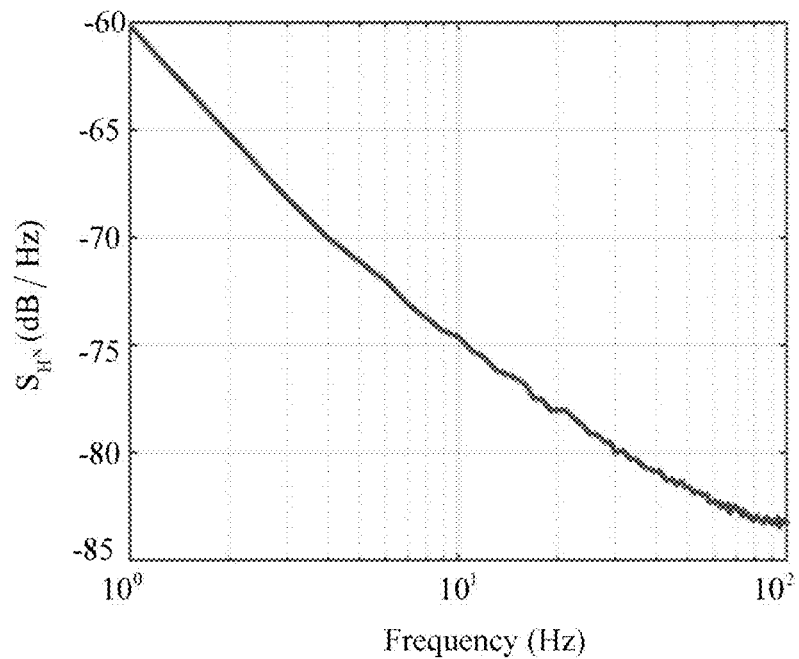
FIG. 7 is a graph presenting the spectral density of flicker noise as a function of frequency.

In this present embodiment, an offset of 1 Hz from the origin is assumed as shown in FIG. 7 and 100 Hz is presumed as the higher limit of the bandwidth. In practice, the higher limit depends on the bandwidth of the low pass filter in the output of power detector (FIG. 3) and the point at which the flicker noise level reaches the white noise floor.

The PSD of noise decays with $A_{noise}/f$ function. $A_{noise}$ may be a constant that is determined based on SNR value in the simulations. FIG. 7 is an example that depicts the PSD of noise for SNR=20 dB, when signal level is −3.4 dBm for one of the 1600 probes. Because of the low-pass filter in the output of the power detector, only the DC and noise components within the filter bandwidth pass through the filter. Thus, as shown in FIG. 7, the horizontal axis is labeled as frequency instead of offset frequency, as the offset stems from a DC value.

The sampled data are extracted from HFSS such that at every point only X or Y component of the magnetic field is available. The modeled noise is added to the magnetic field data and the interpolation techniques are utilized to estimate the value of the component of magnetic field for which there is no sample. Thereafter, the estimated values are compared to the exact values that are obtained from full-wave simulation.

Figure 8:
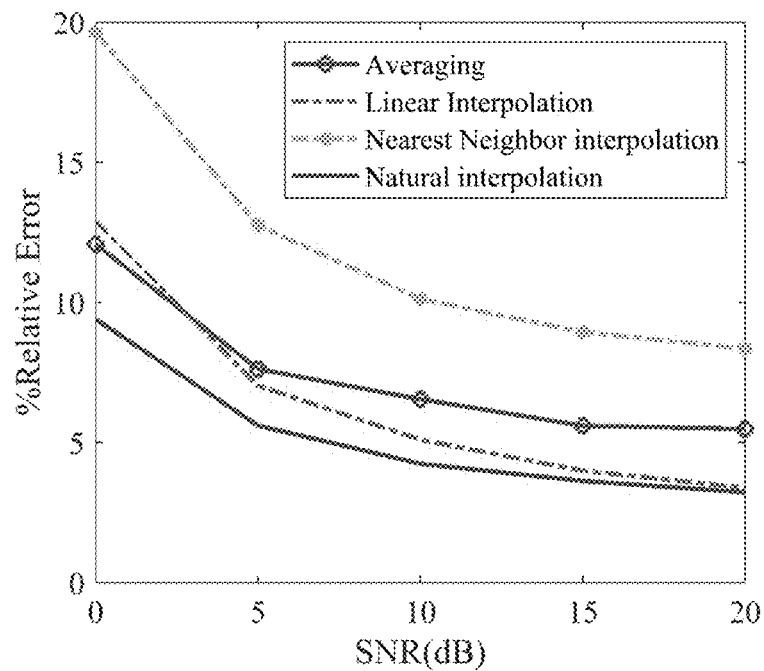
FIG. 8 is a graph presenting the relative error of various interpolation algorithm methods versus different values of SNR(dB)

The results are depicted in FIG. 8. The error is the average of the errors over the whole scan area. The nearest neighbor interpolation has the worst accuracy while the natural neighbor method is a proper candidate that may be efficiently used in the adaptative algorithm. As described herein, this may be explained by the continuity of the interpolant and its derivative in the natural interpolation method. Although the averaging scheme seems simple, it is more accurate compared to the nearest neighbor, for all SNR values, and more accurate than linear interpolation for low SNR values. Among all the investigated algorithms in this work, the natural neighbor method has the highest accuracy in all SNR values.

Figure 9A:
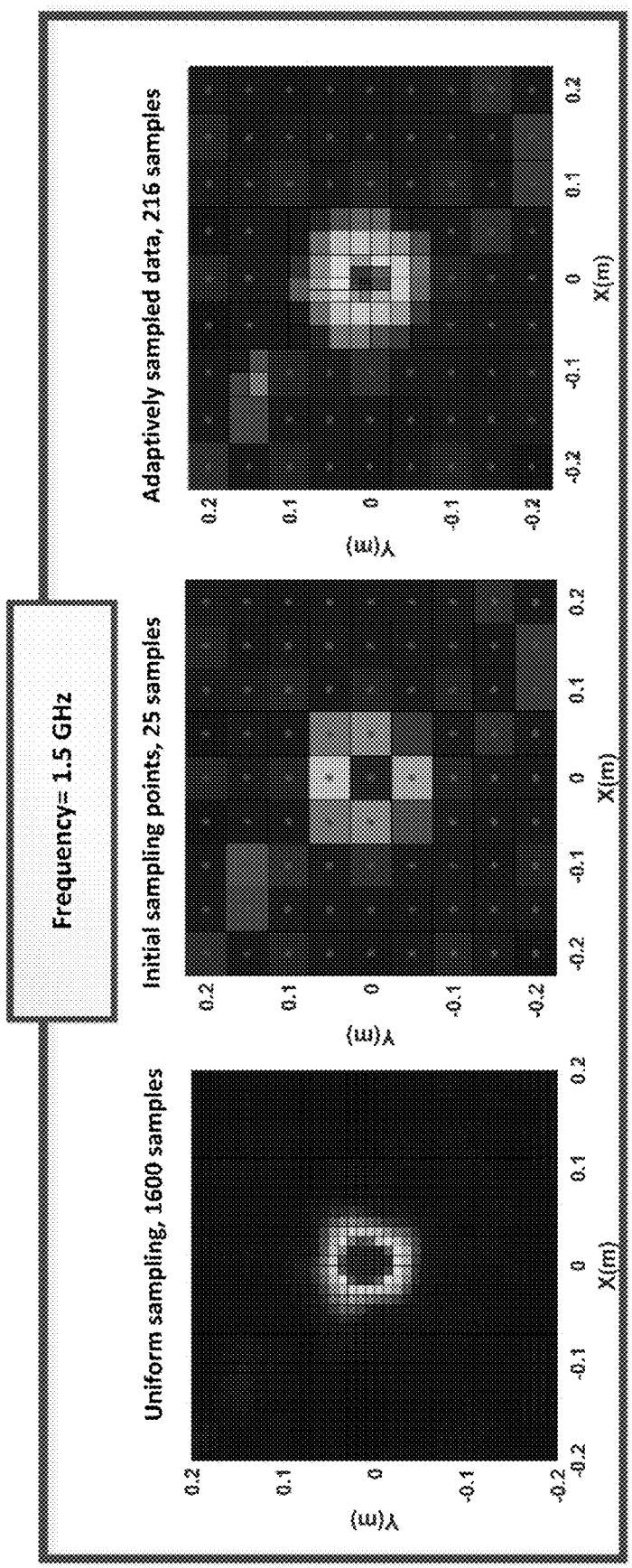
FIG. 9A presents three related heatmaps of exemplary results, respectively for the uniform, the initial and the adaptively sampling method of near-field measurements of the AUT at a frequency of 1.5 GHz, such that side-to-side comparison between the three methods and their varying sampling rates may be done.
Figure 9B:
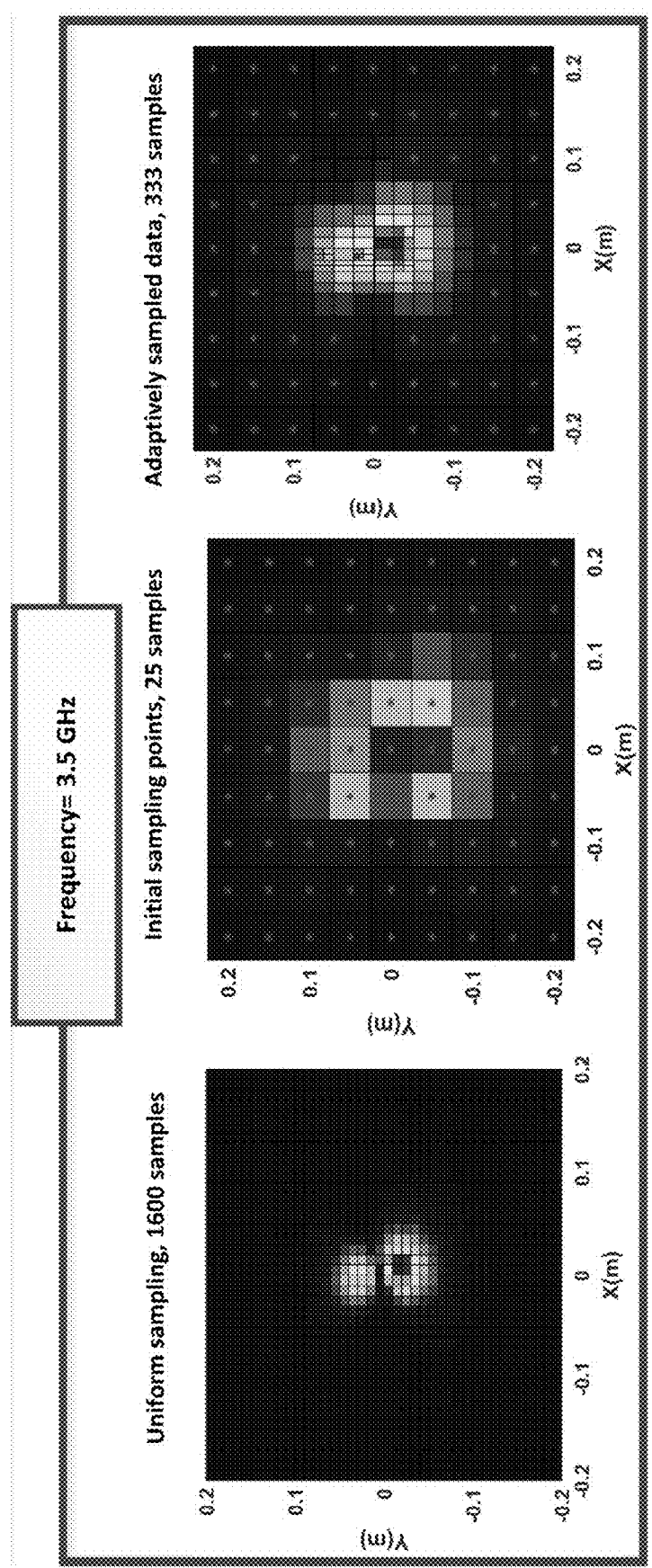
FIG. 9B presents three related heatmaps of exemplary results, respectively for the uniform, the initial and the adaptively sampling method of near-field measurements of the AUT at a frequency of 3.5 GHz, such that side-to-side comparison between the three methods and their varying sampling rates may be done.
Figure 9C:
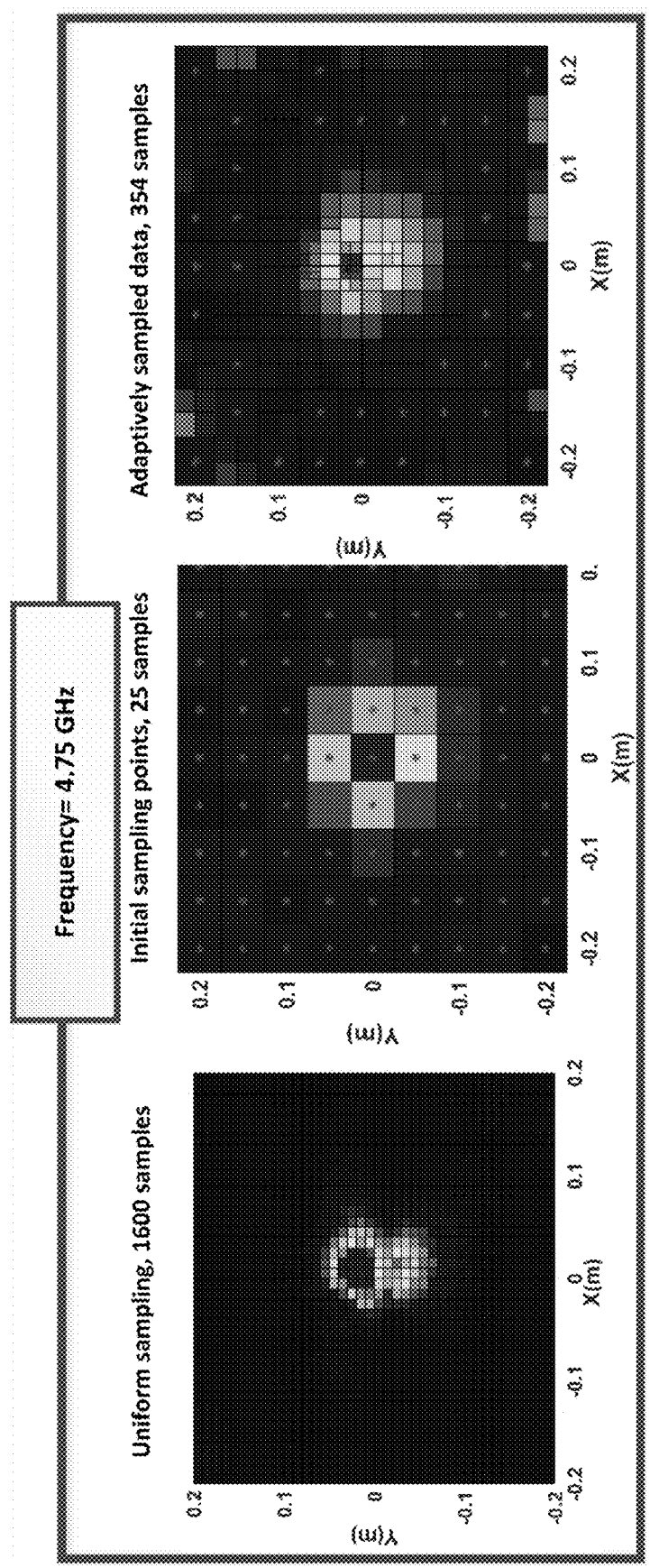
FIG. 9C presents three related heatmaps of exemplary results, respectively for the uniform, the initial and the adaptively sampling method of near-field measurements of the AUT at a frequency of 4.75 GHz, such that side-to-side comparison between the three methods and their varying sampling rates may be done.

Second, the accuracy and validity of the adaptive sampling approach are analyzed. As shown in FIG. 9A through C, the algorithm starts from a small number of uniformly distributed samples, for instance 25 samples. This algorithm sequentially focuses on the area with strongly varying near-field pattern and skip the regions that have smooth behavior. By increasing the number of samples the accuracy of the results necessarily increases.

A comparison between the uniform sampling and adaptive sampling is presented in Table 1 herein, in terms of the number of samples, relative error, NF-FF simulation time, and estimated single-probe measurement time. To calculate the error, the reconstructed currents are used to calculate the magnetic fields over the measurement plane. The reconstructed values are compared with the values extracted from the full-wave simulation. The relative error is calculated as:

$$\text{relative error} = \|H_{x,y}^{Full\text{-}wave\ sim} - H_{x,y}^{reconstructed}\| / \|H_{x,y}^{Full\text{-}wave\ sim}\| \quad (31)$$

As may be seen in Table 1, at 3.5 GHz, the uniform sampling with 1600 sample points results in 10% error and the NF-FF transformation algorithm takes about 15 minutes to be completed, while for the adaptive algorithm, with only 348 sample points, the error remains at 10% and the NF-FF transformation takes only 1 minute.

It is worth mentioning that this comparison is a single frequency measurement over one plane. Measurements for several frequencies and planes are required and, therefore, the required time is increased drastically for the uniform sampling. The estimated single probe measurement time in Table 1 is calculated based on the timing that is shown in FIG. 10.

Figure 10:
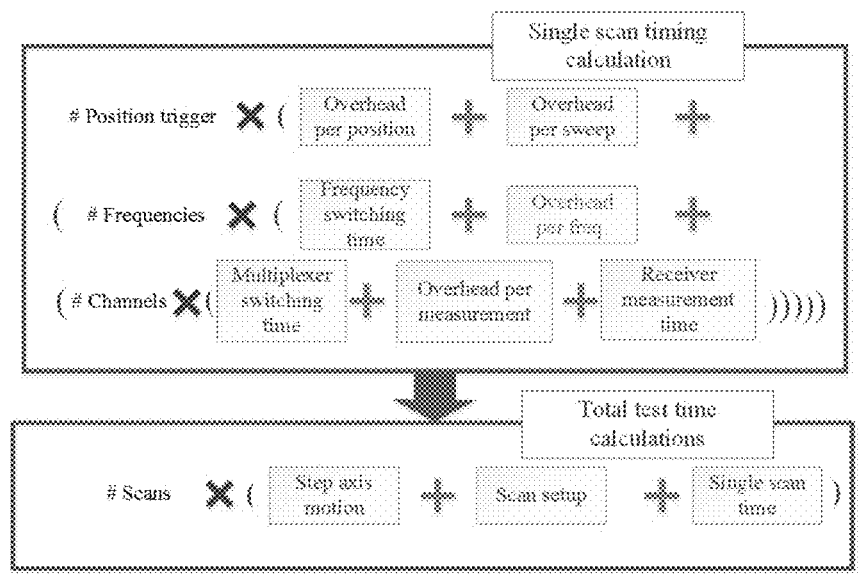
FIG. 10 illustrates the equations for single scan and total test time calculation in case of single probe measurement [14]

As it is depicted in FIG. 10, for multiple channels and frequencies, the measurement time increases significantly. Assuming 0.25 seconds for the step axis motion (for instance, using 8MT295Z-340 positioner in [20]) regardless of the required time to read and record data, for a single frequency and channel, changing the number of samples from 1600 to 348 equals to a reduction of the required time from 13.3 min. to 2.9 min. approximately (single probe measurement). This reduction is significant when multiple frequency and channel measurement are required.

Figure 11A:
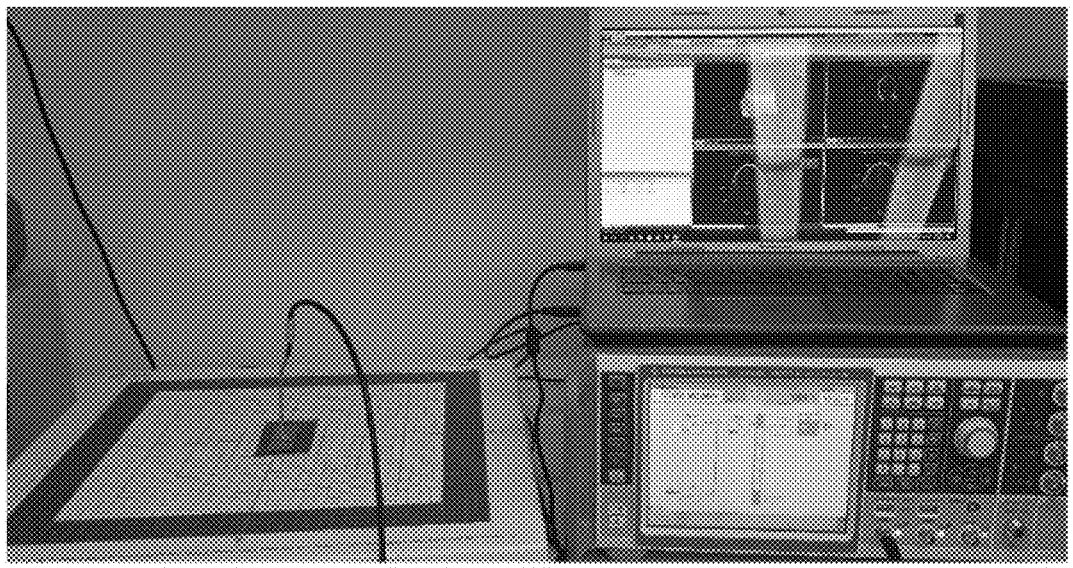
FIG. 11A is an exemplary setup for the measurement of an antenna under test, including the probe array connected to a computer and an antenna under test connected to a signal generator.
Figures 11B, 11C:
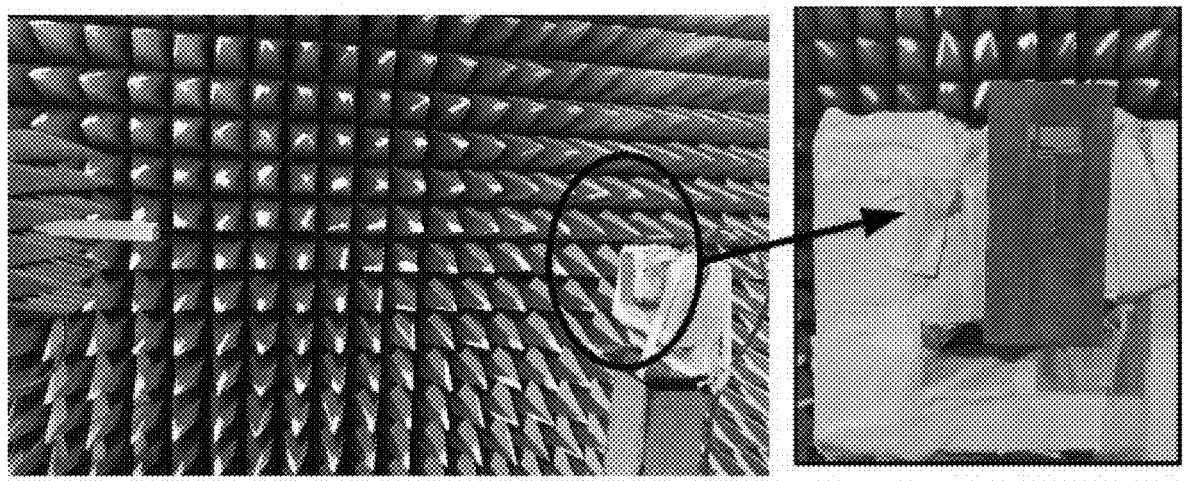
FIG. 11B is an exemplary setup for the measurement of an antenna under test in an anechoic chamber, including the AUT and the waveguide probe.
FIG. 11C is a focused view of the planar antenna under test of the exemplary setup presented in FIG. 11B.

In the next step, the sampled data is input in the HFSS Full-wave simulator and actual measured near-fields along with the SRM are used to calculate the far-field pattern of the antenna. The HFSS model only includes the antenna and not the probes. The measurement setups, using both the RFxpert probes and a traditional near-field anechoic chamber, are shown in FIG. 11A through C. In an anechoic chamber, the near-field of the antenna is measured and converted to far-field in the standard near-field to far-field software of the chamber.

When RFxpert is used for near-field measurement, the natural neighbor interpolation is used to interpolate the data at the newly added sample points, as well as the second component of the tangential magnetic field at the location of each probe.

Figure 12A:
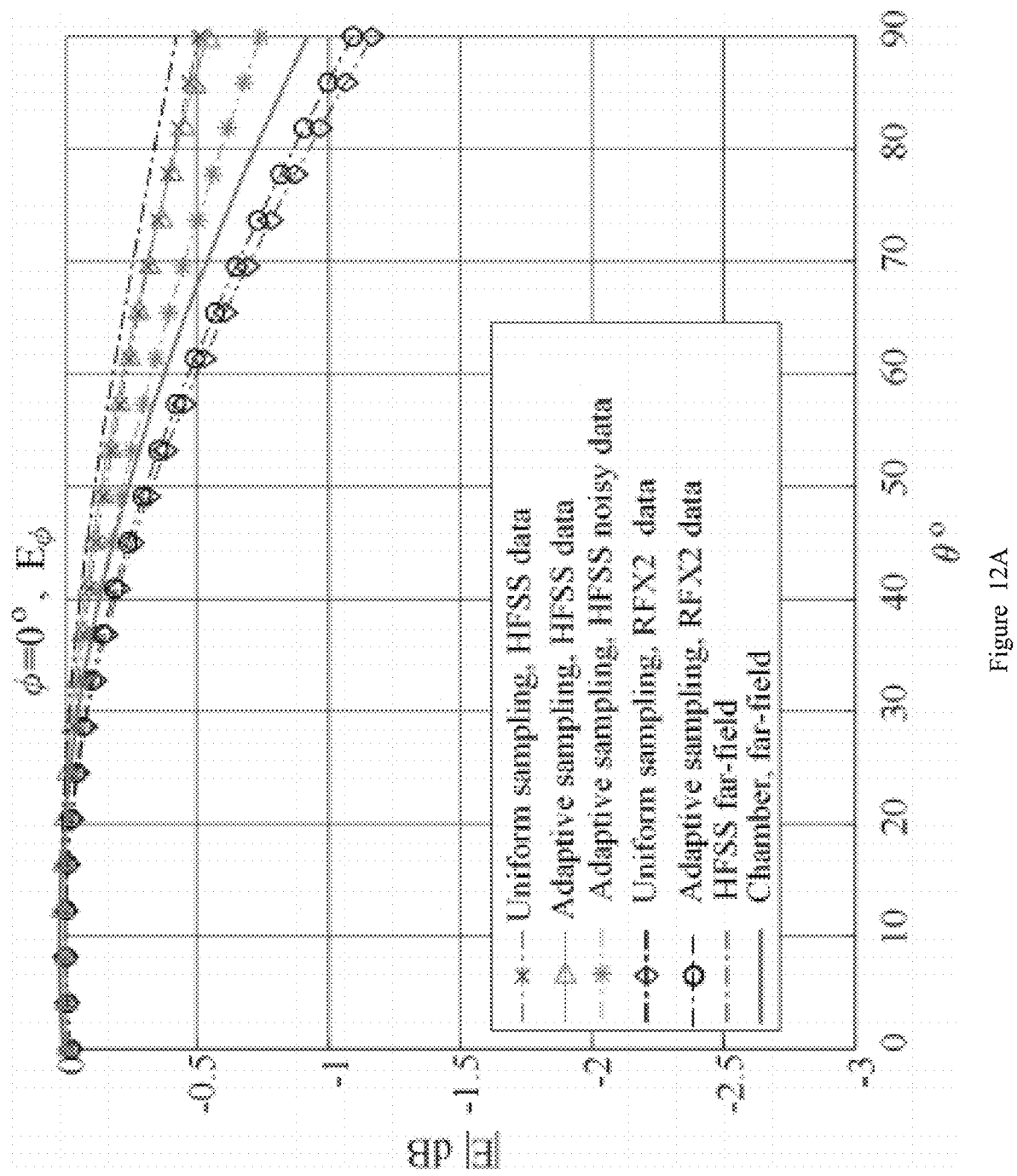
FIG. 12A is a graph presenting the far-field pattern of the antenna at 1.5 GHz, obtained from full-wave simulation and various measurement and sampling techniques, for $\phi=0°$ and $E_\phi$.
Figure 12B:
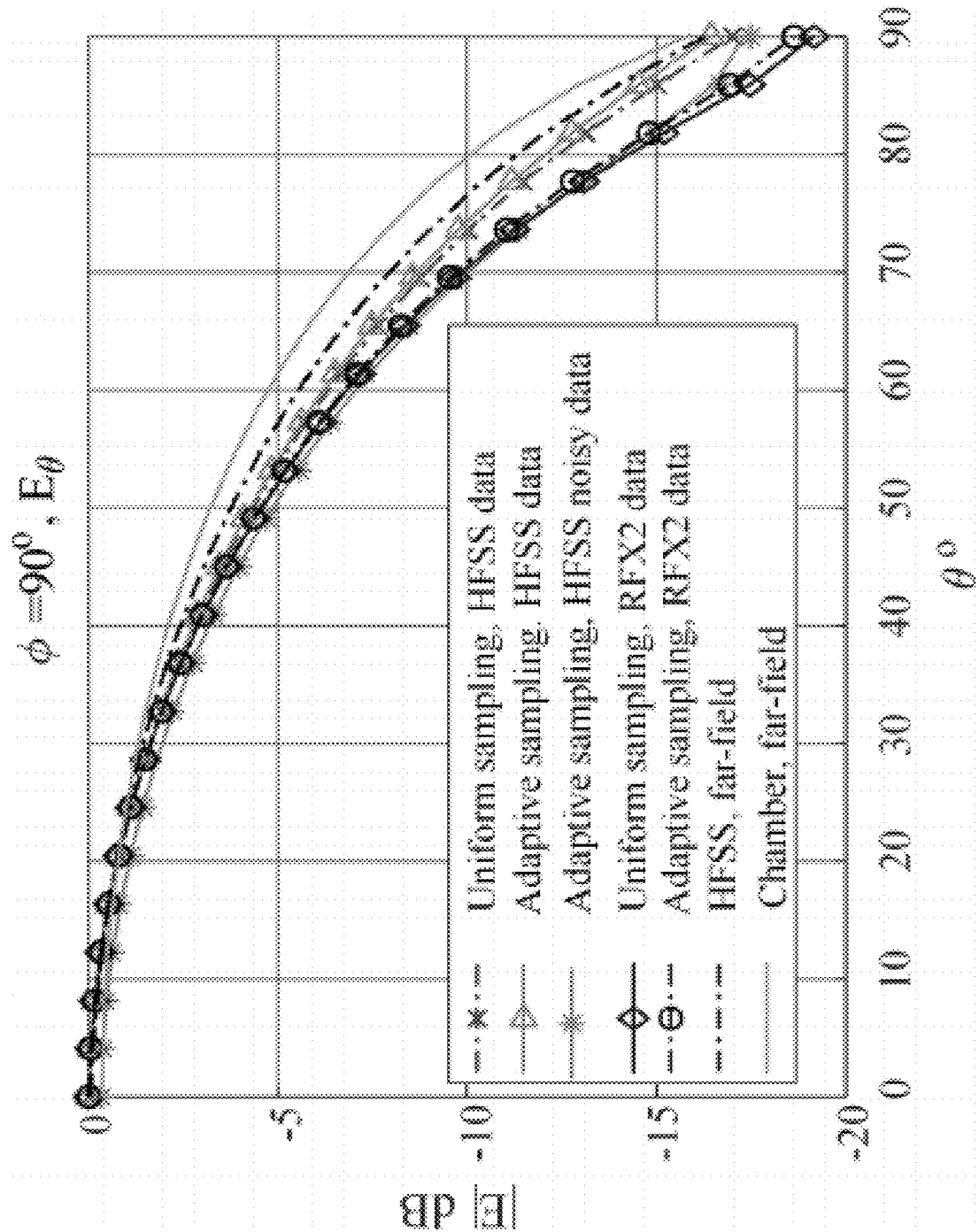
FIG. 12B is a graph presenting the far-field pattern of the antenna at 1.5 GHz, obtained from full-wave simulation and various measurement and sampling techniques, for $\phi=90°$ and $E_\theta$.

The far-field pattern of antenna at 1.5 GHz is shown in FIGS. 12A and B. In this embodiment, the number of samples for uniform sampling is 1600 and for adaptive sampling the number of samples used is 216. For the noisy data, the noise components with PSD of $1/f$ are added to the samples that are extracted from HFSS, such that the SNR is 5 dB.

From FIGS. 12A and B it may be seen that far-field pattern obtained using the uniform and adaptive algorithms are very close. The inaccuracy of the far-field patterns obtained from the measured NF data of RFxpert or of the chamber may be due to the manufacturing imperfections and existence of other noise and error components.

Figure 13A:
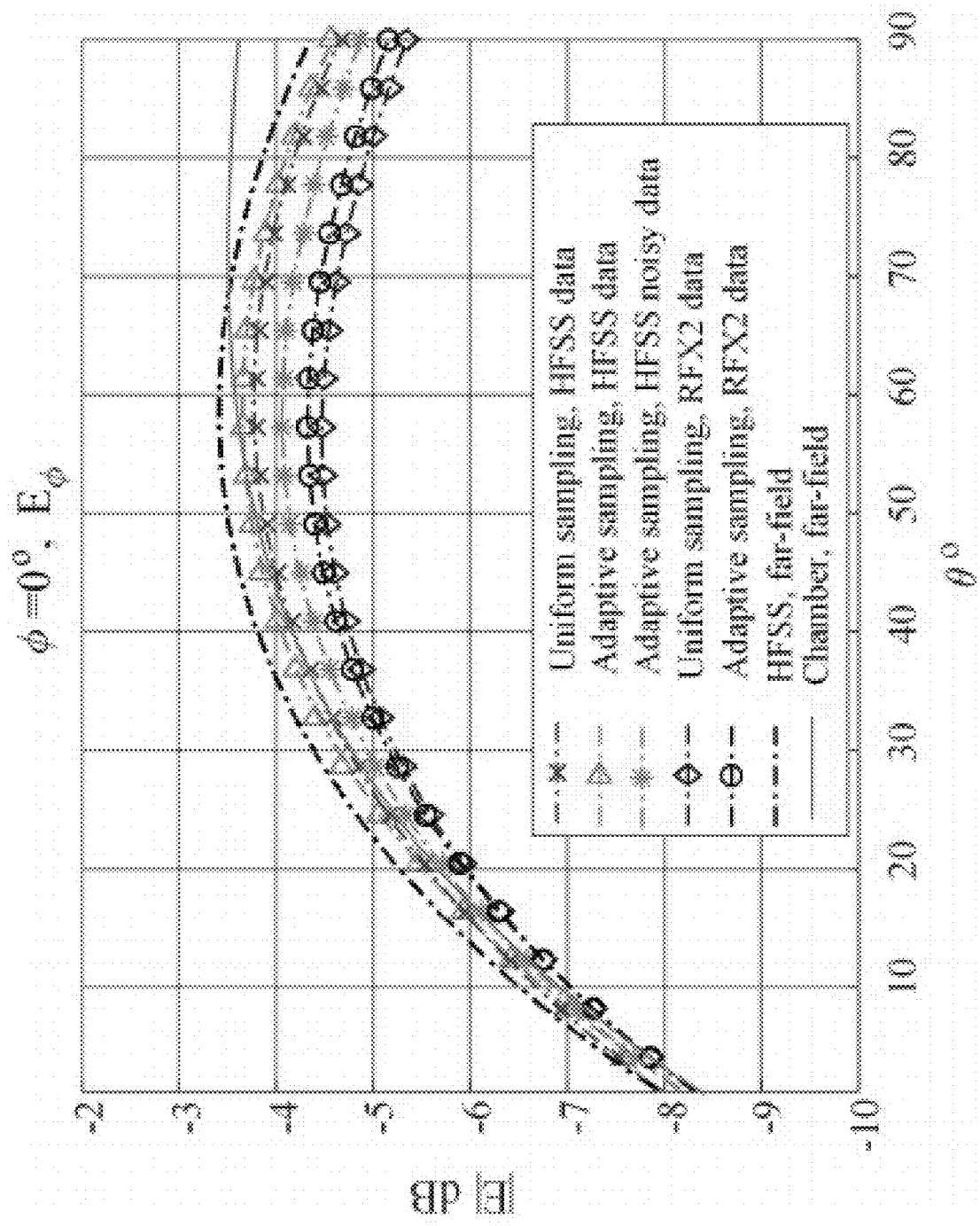
FIG. 13A is a graph presenting the far-field pattern of the antenna at 3.5 GHz, obtained from full-wave simulation and various measurement and sampling techniques, for $\phi=0°$ and $E_\phi$.
Figure 13B:
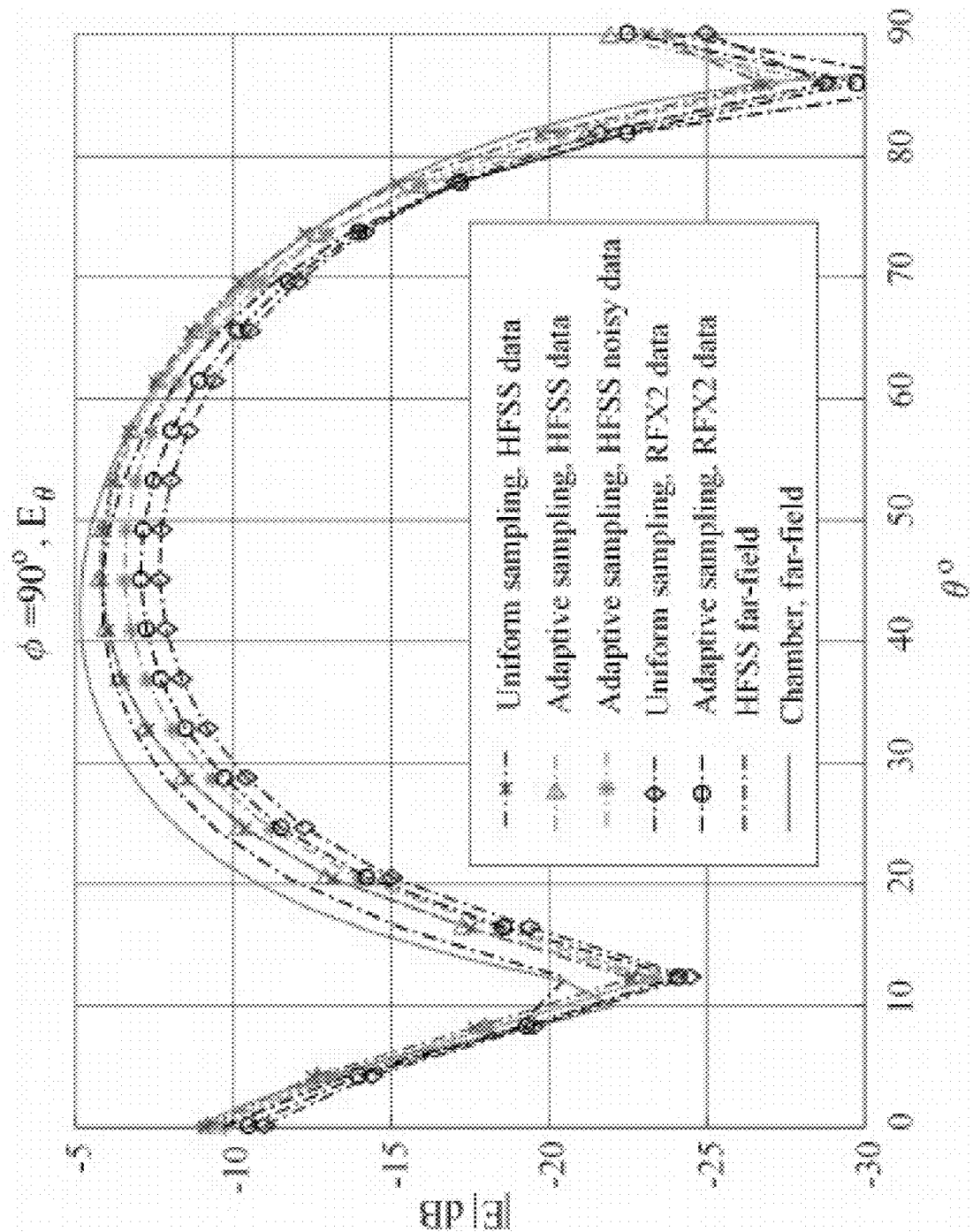
FIG. 13B is a graph presenting the far-field pattern of the antenna at 3.5 GHz, obtained from full-wave simulation and various measurement and sampling techniques, for $\phi=90°$ and $E_\theta$.

The AUT patterns at 3.5 GHz are plotted in FIGS. 13A and B. It will be appreciated that the uniform and adaptive sampling, respectively with 1600 and 348 samples, have same accuracy.

Figure 14A:
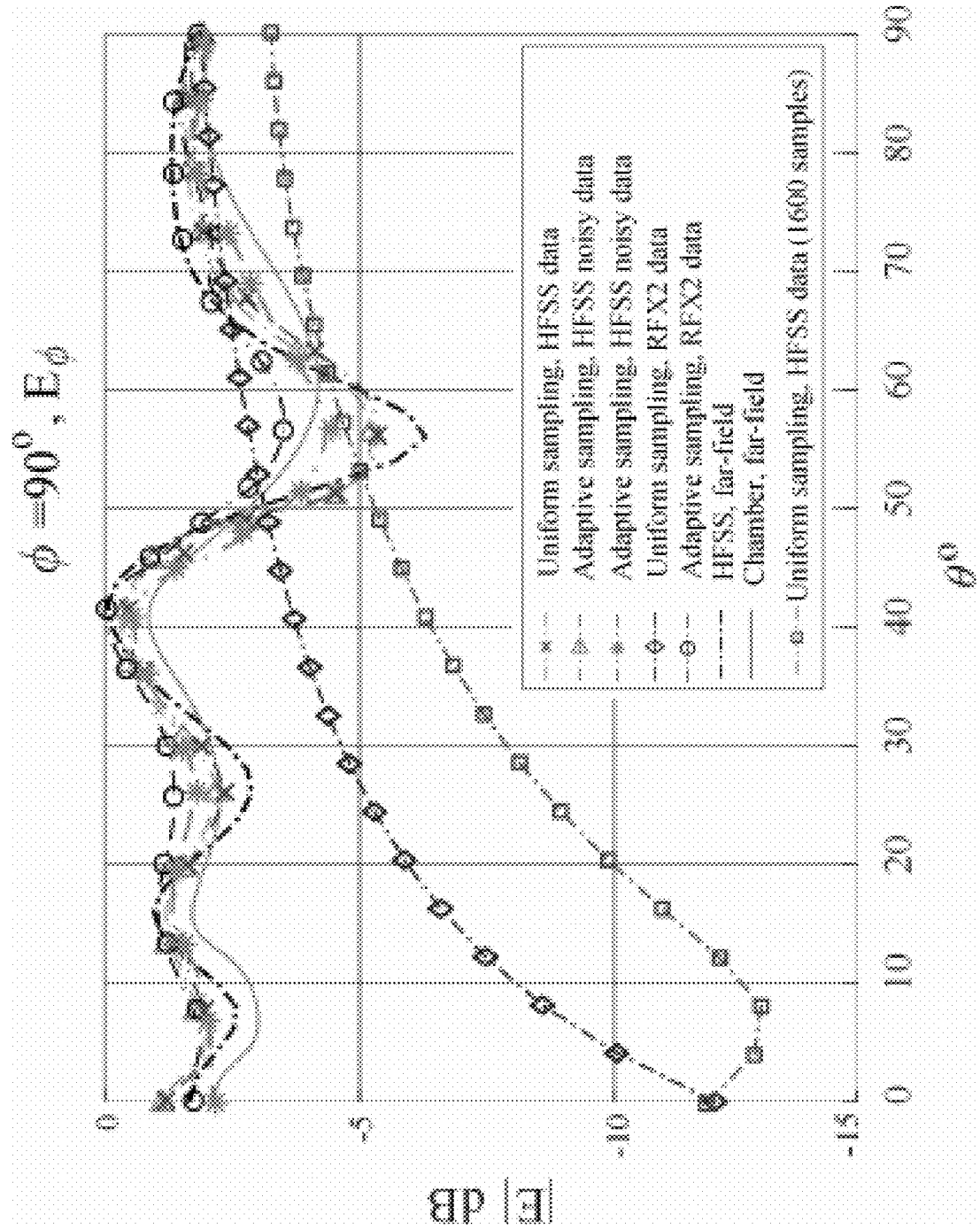
FIG. 14A is a graph presenting the far-field pattern of the antenna at 4.75 GHz, obtained from full-wave simulation and various measurement and sampling techniques, for $\phi=90°$ and $E_\phi$.
Figure 14B:
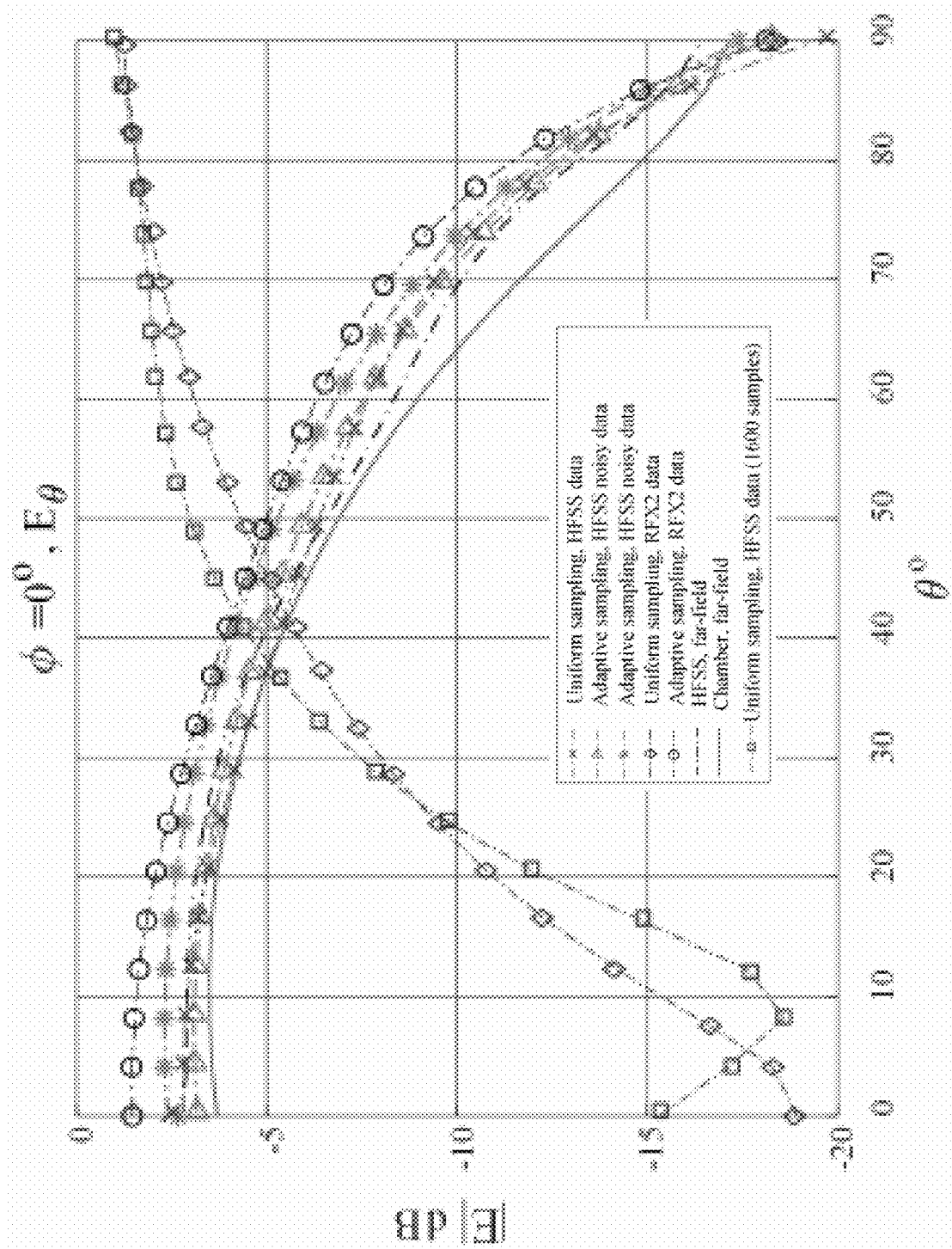
FIG. 14B is a graph presenting the far-field pattern of the antenna at 4.75 GHz, obtained from full-wave simulation and various measurement and sampling techniques, for $\phi=0°$ and $E_\theta$.

The results for 4.75 GHz (FIGS. 14A and B) show that even with 1600 samples (the number of RFxpert probes) the far-field pattern is not acceptable, and 10201 samples with 2 mm sampling resolution are required to have an acceptable far-field pattern while for the adaptive algorithm only 354 samples are required.

There is no measured result using RFxpert for 10201 samples because to achieve the resolution of 2 mm, the AUT has to be moved up (Y direction in FIG. 1) manually a total of 10 times and sideways (X direction in FIG. 1) a total of 5 times for 50 total measurements. For instance, the first position is (0,0). The second position is up 2 mm. For the first 10 measurements, the board is moved up each time. Then the sample is shifted 2 mm to the right and all 10 upward measurements are repeated. Ten upward measurements may thus be done because the probes measure only one polarization. In the data set of the RFxpert software, the data are interpolated to fill in the missing values. Hence, the interpolated data must be discarded and then the final 5 measurements of an upward sweep are used to fill in the other polarization. Therefore, a power divider has to be used to provide an external stable phase reference to the scanner to make sure all the scans are phase coherent. Due to the difficulty and inaccuracy of the process this test has not been performed in this paper. The uniform sampling result of RFxpert shown in the figure is with 1600 samples.

Figure 15:
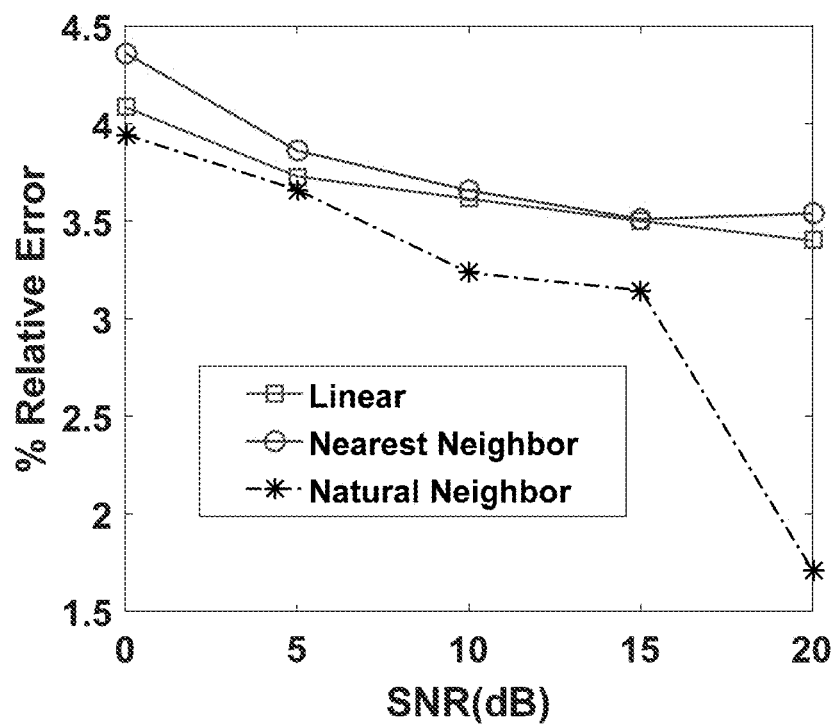
FIG. 15 is a graph of the relative error of various interpolation algorithm methods versus different values of SNR(dB)

Finally, the performance of linear, nearest and natural neighbor interpolation techniques to calculate the value of sequentially added samples is assessed for different SNR levels, as can be seen in FIG. 15. The SNR values on the horizontal axis are defined as discussed in the explanation of FIG. 7, and the error is an average of error for the whole 3D far-field pattern of antenna at 3.5 GHz. The natural neighbor interpolation outperforms the other methods because of the continuity of the interpolant and its derivative. Yet, in low SNR values, the accuracy of three methods are not very different and one can compromise between accuracy and complexity.

TABLE 1

The comparison between the uniform and adaptive sampling techniques for the near-field of the AUT at 3.5 GHz

| Sampling Technique | Number of samples | Estimated Single Probe Measurement Time | Relative Error (%) | NF-FF Simulation Time |
|---|---|---|---|---|
| Uniform Sampling | 1600 | 13.3 minutes | 10% | 15 min |
| Adaptive Sampling | 348 | 2.9 minutes | 10% | 1 min |

The adaptive algorithm has an even greater impact in the case of compact range near-field measurements, since in these cases the computational cost increases, due to the requirement of to have several correction algorithms, including probe correction, absorber correction, etc., to correct the distorted measured near-field data. These algorithms are explained below.

5. Probe Correction

For near-field to far-field transformation algorithms, including wave mode expansion and sources reconstruction method, near-field distortion due to the measurement errors impacts the calculated far-field. One of the most important sources of error is the distortion caused by the radiation pattern of the measuring probe. For instance, in source reconstruction method, this correction results the equivalent currents that are different from the equivalent currents of AUT, and consequently error in the calculated far-field pattern. Therefore, a probe correction algorithm is required to remove this distortion from the measured near-field data.

In near-field measurement systems, particularly for compact testing chambers, the distance between the AUT and the probe can be short such that the impact of the probe distortion in the measured field is significant. To decrease the distortion a probe antenna with a pattern as omnidirectional as possible can be chosen.

On the other hand, probes with a certain directivity and low-level secondary lobes are mostly used, because of multipath effects due to reflections from anechoic chamber elements, namely positioners and walls. The distortion due to a non-isotropic probe antenna pattern can be corrected if the pattern is known. For the wave-mode expansion, the probe pattern is represented in terms of the wave-mode model of the probe antenna. For the source reconstruction method, the probe's antenna pattern values are considered as weights in the electric field integral equations that relate the measured fields to the equivalent currents.

Figure 16:
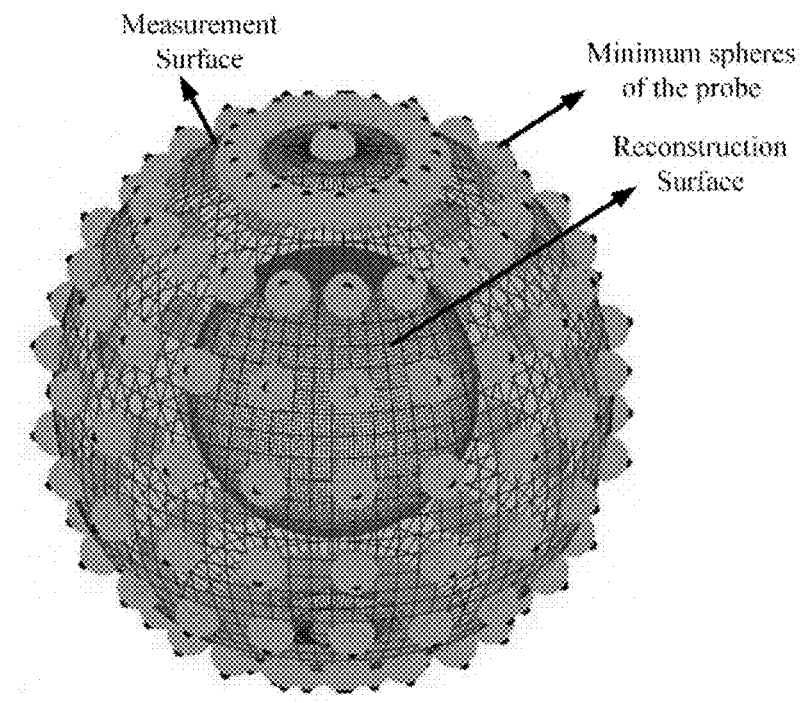
FIG. 16 illustrates the spherical measurement and reconstruction surface as well as minimum sphere of the probe at each measurement point.

To determine the probe distortion, the knowledge of the probe's pattern, and position relative to the AUT is required. The distance between the probe and AUT, and the size of AUT determines the maximum angle over which the AUT equivalent sources can be seen by the probe. The resulting matrix system relating the measured θ-field component with the equivalent currents is $$[E_\theta^{meas}(r, \theta)] = [Z_J(r, \theta; r'), Z_M(r, \theta; r')] \begin{bmatrix} W & 0 \\ 0 & W \end{bmatrix} \begin{bmatrix} J(r') \\ M(r') \end{bmatrix}$$

Where W is the weighting function for the probe antenna pattern. In FIG. 16 the measurement and reconstruction surface as well as minimum sphere of the probe at each measurement point are depicted.

6. Absorber Correction

Antenna patterns are usually measured in anechoic testing chambers to be able to consider only the signals that propagate along the line-of-sight between the AUT and the measuring probe. However, the anechoic chambers are not ideal and most of the time there are some reflections, that may come from the metallic parts of the set up and even from the absorbers, especially at low frequencies as the absorbers cannot exhibit excellent low-frequency EM wave absorbing properties.

The proposed calibration technique removes artifacts from near-field antenna measurement. This technique is based on an initial calibration measurement using a known antenna and identify the probe and stationary parts of the measurement chamber including the absorbers in terms of a set of correction coefficients. These coefficients are utilized to recover the correct antenna pattern from the distorted measured near-field data through a correction algorithm.

Figure 17:
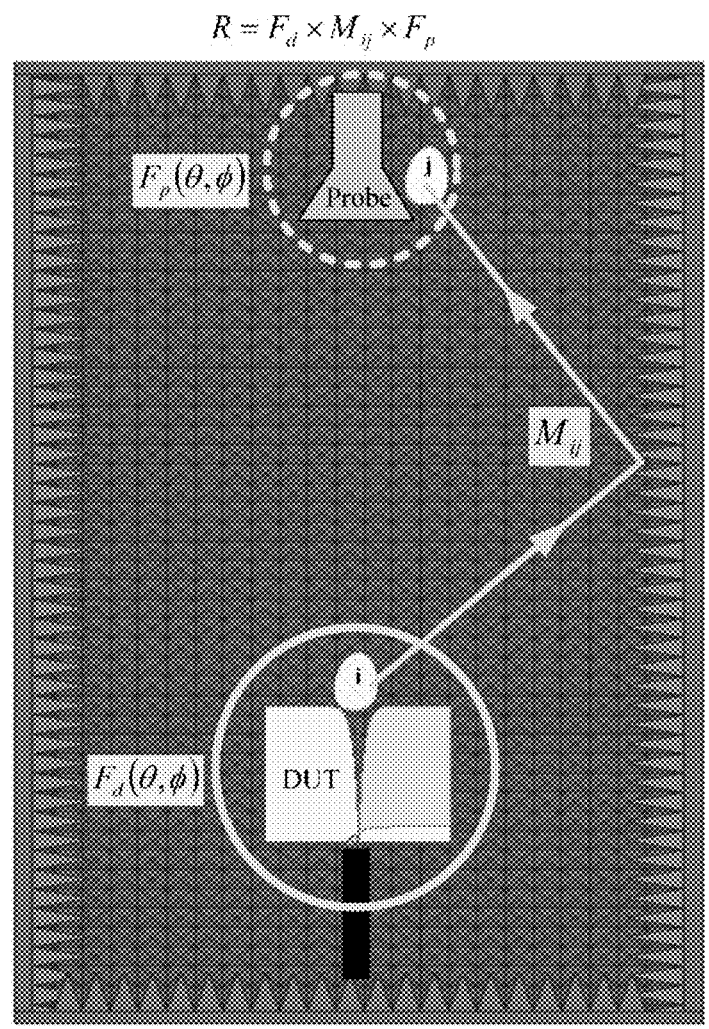
FIG. 17 is a schematic of an exemplary setup of a probe and a device under test in an anechoic test chamber, such that may be used in the extended probe correction algorithm to remove the reflections from the absorbers.

This correction algorithm views the probe as not only the probe antenna but also fixed scatterers in the chamber including the absorbers. It seems that there is an extended probe that may be calibrated in terms of its response to the fields radiated by the AUT. Thereafter, this calibration may be used to correct the measured probe response in the near-field. This algorithm is depicted in FIG. 17. The matrix M represents the correction coefficients of the absorbers and $F_p$ and $F_d$ are the correction coefficients of two known antennas that are used for the calibration.

7. Probe and Absorber

Figure 18:
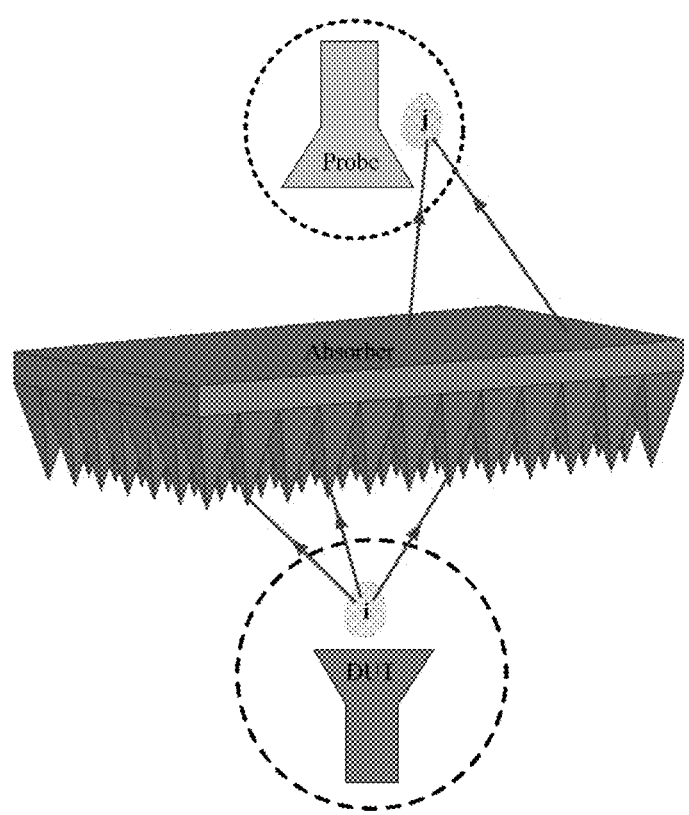
FIG. 18 is a schematic illustrating the use of an absorber to decrease the coupling between the probe and the device under test.

In some tests, for example when the distance between the probe and AUT is short, there is a coupling between the antenna and measuring probe. To remove this distortion, an absorber can be added between the probe and AUT. The calibration coefficient of this absorber needs to be derived and used in a correction algorithm to correct the near-field data as shown in FIG. 18. Another approach is using the matrix pencil method to treat multi-path signals including the diffraction from the internal metal scattering and the truncation diffraction from the finite aperture. In this method, the fields are decomposed into exponential components with different propagation path lengths or time delays, which represent various diffraction components. Based on the location of the AUT, the shortest paths are assumed to be radiated directly from the AUT and are extracted as the corrected near-field data.

8. Using Modulated Signal

For the measurement of the modulated fields, the modulation signal may be assumed to be constant, for short measurement interval, if the carrier and modulation frequencies are far enough. Another approach is long-time measurements in order to have complete frequency spectrum in every measurement. The relation between time and frequency domain is given by Fourier transform. When it comes to the measurement of real-world signals, a window function is introduced, such that it is only non-zero in the measurement period.

In the long-time approach, the relevant frequency components are determined by a Fourier Transform. The far field patterns are obtained using NF-FF transformation. The disadvantage of this method is that the measurement duration defines the feasible frequency resolution. This means that the time of measurement can be very long when a fine frequency resolution is required to model the frequency behavior of the measured signal. On the other hand, in the short time measurement approach, the modulation can be considered constant such that only the carrier frequency is measured.

This implies that the envelope of the modulated signal is sampled by every measurement. The result is a time harmonic field value at the carrier frequency of the field signal, weighted with the constant factor $m_i$. If the whole time-varying NF is sampled so, all measurement samples that share the same constant weighting factor $m_i$ build a set of field values with the same modulation state. Because of the linearity of the field transformation, the far-field also is weighted by the same constant factor $m_i$.

As was described hereinabove, a new approach is presented to improve the accuracy and speed of the planar near-field measurement of antennas. The near-field measurements are performed using a probe array. For modeling the noise of magnetic fields in the reconstruction calculations, the relation between the noise of the input power and the output voltage has been extracted analytically. Since in the probe array at each probe only one component of magnetic field is measured, the accuracy of various interpolation techniques to estimate the other component has been evaluated and the natural neighbor method was found as the best candidate compared to the linear, averaging and nearest neighbor approaches.

Thereafter, the preferred embodiment uses an adaptive sampling technique that sequentially adds more data points for the regions with high dynamic behavior. This approach results in the significant reduction of the required samples, for example from 1600 to 348 samples. Finally, the adaptive algorithm along with the natural neighbor interpolation and SRM may be used to calculate the far-field pattern of AUT. The results show that for far fewer numbers of samples, the same accuracy may be achieved. The accuracy and validity of the proposed methods are confirmed using the numerical and measurement results.

The proposed adaptative algorithm may also be used in cases where the near-field data is used to create a spectral-spatial scan for the DUT, perform EMC/EMI diagnostic tests, and calculate parameters of antenna such as gain, directivity, etc. Moreover, this algorithm can significantly reduce the computational cost, particularly in compact range near-field measurement where correction algorithms are required to minimize the distortion effect in the measured near-field data.

It will be appreciated by someone skilled in the art that the equations presented herein are but an exemplary set of equations to achieve the presented disclosure, and other calculations may be performed to achieve the near-field data points without departing from the teachings of this disclosure. Additionally, using different kinds of probes or array of probes in order to ultimately obtain measurements of the electric or magnetic field surrounding the device under test may be used without departing from the teachings of this disclosure.

Figure 19:
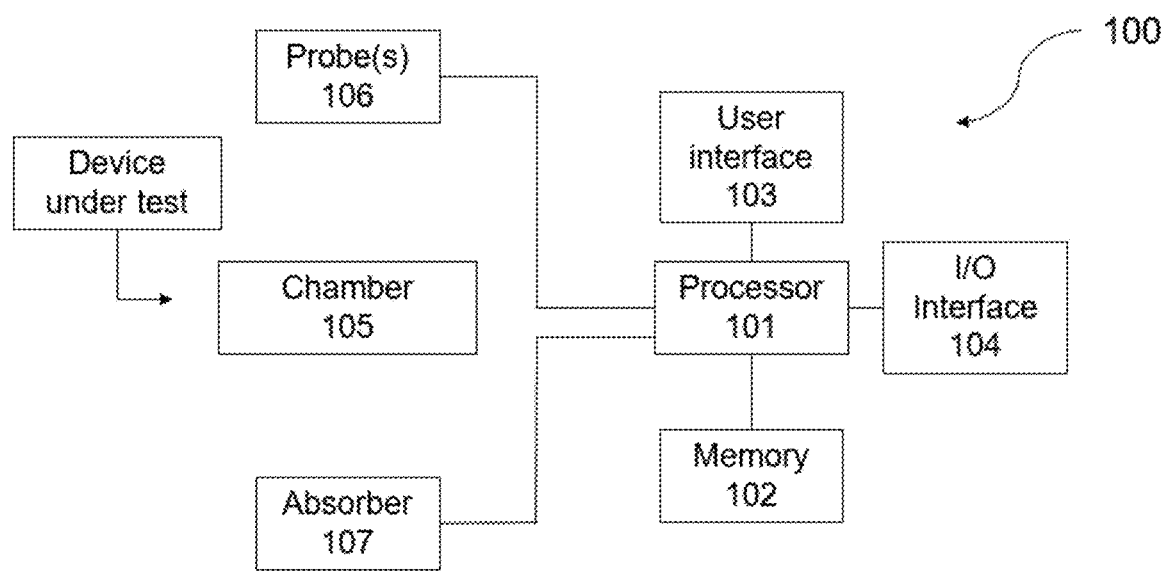
FIG. 19 is a block diagram of an exemplary system for generating near-field data.

Exemplary System for Generating Near-Field Data:

Reference is now made to FIG. 19, illustrating an exemplary system for generating near-field data 100.

The system 100 includes a processor 101, memory 102, one or more probes 106, and a chamber 105.

The system 100 may include an absorber 107, an input/output interface 104 and a user input interface 103.

The processor 101 may be a general-purpose programmable processor. In this example, the processor 101 is shown as being unitary, but the processor may also be multicore, or distributed (e.g. a multi-processor).

The computer readable memory 102 (e.g. non-transitory) stores program instructions and data used by the processor 101. For instance, memory 102 may store program code for obtaining the near-field data that, when executed by the processor 102, causes the processor 102 to perform the steps as described herein for obtaining the near-field data. The computer readable memory 102, though shown as unitary for simplicity in the present example, may comprise multiple memory modules and/or cashing. In particular, it may comprise several layers of memory such as a hard drive, external drive (e.g. SD card storage) or the like and a faster and smaller RAM module. The RAM module may store data and/or program code currently being, recently being or soon to be processed by the processor 101 as well as cache data and/or program code from a hard drive. A hard drive may store program code and be accessed to retrieve such code for execution by the processor 101 and may be accessed by the processor 101 to store near-field data points, etc. as explained herein. The memory 102 may have a recycling architecture for storing, for instance near-field data, data points, areas associated with data points, etc., where older data files are deleted when the memory 102 is full or near being full, or after the older data files have been stored in memory 102 for a certain time.

The I/O interface 104 is in communication with the processor 101. The I/O interface 104 is a network interface and may be a wireless or wired interface for establishing a remote connection with, for example, a remote server, an external database, a client computer etc. For instance, the I/O interface 104 may be an Ethernet port, a WAN port, a TCP port, a transceiver, etc.

The user input interface 103 is an interface for receiving input from the user. An exemplary user input interface 103 may be, for instance, a keyboard, a mouse, a touchscreen, a microphone, a proximity sensor, a heat sensor, a biometric scanner, etc. The user input interface 103 is connector to the processor 102 via, e.g., a BUS.

The chamber 105 is an enclosure used for receiving the device under test for the purpose of, e.g., testing and/or diagnosis. The chamber 105 may be, for instance, an anechoic chamber, a reverberation chamber, or a gigahertz transverse electromagnetic cell (GTEM cell).

The one or more probes 106 are located in the chamber 105, or can be moved to the chamber 105 for the purpose of generating the near-field data. A probe is an electromagnetic element that converts magnetic and/or electric fields to currents which can be measure by equipment such as vector network analyzer (VNA), spectrum analyzer, oscilloscope, or power meter. The probe may be one, more than one, or a combination of small loop antennas and small dipole antennas to measure electric and/or magnetic fields in one, two, or three directions.

Exemplary probes 106 may include electric (monopole or dipole antenna), magnetic (loop antenna) and electromagnetic (horn antenna) probes. The one or more probes 106 may be configured as an array. The one or more probes 106 may be part of a dielectric. The one or more probes 106 may be connected (e.g. via a wired connection) to the processor 101, where the processor 101 may send out commands to control the one or more probes 106.

The absorber 107 may also be present in the chamber 105. The absorber 107 may also be connected to the processor 101. An absorber 107 is an object that absorbs electromagnetic fields (such as magnetically loaded rubber or dielectric foam with high dielectric loss).

As such, a device under test may be placed in the chamber 105. A computer (including the processor 101 and the memory 102) may be used to control the one or more probes 106 to measure the amplitude and/or phase of an electric field and/or a magnetic field at a plurality of points at one or more predetermined heights and a plurality of locations in proximity to a device under test.

Moreover, the memory 102 may further include program code that, when executed by the processor 101, causes the processor 101 to remove disruption caused by the chamber 105 and/or disruptive objects. A disruptive object is an object that disrupts a magnetic field or electric field, such as an accessory added into the chamber 105 that may disrupt a magnetic field or electric field.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

REFERENCES

[1] A. Yaghjian, "An overview of near-field antenna measurements," *IEEE Trans. Antennas Propag.*, vol. 34, no. 1, pp. 30-45, 1986.

[2] F. D'agostino, F. Ferrara, C. Gennarelli, R. Guerriero, and G. Riccio, "An Effective Technique for Reducing the Truncation Error in the Near-Field-Far-Field Transformation With Plane-Polar Scanning," *Prog. Electromagn. Res. PIER*, vol. 73, pp. 213-238, 2007.

[3] F. D'Agostino, F. Ferrara, C. Gennarelli, R. Guerriero, and M. Migliozzi, "Nonredundant NF-FF transformation with bi-polar scanning: Experimental testing," in *AMTA 2016 Proceedings*, 2016, pp. 1-6.

[4] M. A. Qureshi, C. H. Schmidt, and T. F. Eibert, "Adaptive rectangular spiral acquisition technique for planar near-field antenna measurements," in 2013 *7th European Conference on Antennas and Propagation (EuCAP)*, 2013, pp. 2926-2929.

[5] M. A. Qureshi, C. H. Schmidt, and T. F. Eibert, "Adaptive Sampling in Spherical and Cylindrical Near-Field Antenna Measurements," *IEEE Antennas Propag. Mag.*, vol. 55, no. 1, pp. 243-249, 2013.

[6] D. Janse Van Rensburg, "Adaptive Acquisition Techniques for Planar Near-Field Antenna Measurements-Part2," CA, USA, 2012.

[7] R. Rafiee Alavi, A. Kiaee, R. Mirzavand, and P. Mousavi, "RWG MoM-via-locally corrected Nystrom method in near-field to far-field transformation using very-near-field measurement," *IET Microwaves, Antennas Propag.*, vol. 12, no. 2, pp. 145-153, 2018.

[8] D. Deschrijver, K. Crombecq, H. M. Nguyen, and T. Dhaene, "Adaptive Sampling Algorithm for Macromodeling of Parameterized S-Parameter Responses," *IEEE Trans. Microw. Theory Tech.*, vol. 59, no. 1, pp. 39-45, 2011.

[9] D. Deschrijver, F. Vanhee, D. Pissoort, and T. Dhaene, "Automated Near-Field Scanning Algorithm for the EMC Analysis of Electronic Devices," *IEEE Trans. Electromagn. Compat.*, vol. 54, no. 3, pp. 502-510, 2012.

[10] T. Dorné and F. Vanhee, "Optimized sequential sampling algorithm for EMI near-field scanning," in *International Symposium on Electromagnetic Compatibility*, 2013, pp.

[11] H. Ledoux and C. M. Gold, "Spatial Interpolation: From Two to Three Dimensions," *GIS Res. UK*, 13*th Annu. Conf.*, pp. 518-523, 2005.

[12] H. Ledoux, "Modelling Three-dimensional Geoscientific Fields with the Voronoi Diagram and its Dual," PhD Dissertation, University of Glamorgan, Wales, U K, 2006.

[13] H. Ledoux and C. Gold, "An Efficient Natural Neighbour Interpolation Algorithm for Geoscientific Modelling," *Dev. Spat. Data Handl.*, no. May, pp. 97-108, 2014.

[14] A. Kiaee, R. R. Alavi, R. Mirzavand, and P. Mousavi, "Numerical and Experimental Assessment of Source Reconstruction for Very Near-Field Measurements With an Array of H-Field Probes," *IEEE Trans. Antennas Propag.*, vol. 66, no. 3, pp. 1311-1320, 2018.

[15] S. Grop and E. Rubiola, "Flicker noise of microwave power detectors," in *IEEE International Frequency Con-* trol *Symposium Joint with the 22nd European Frequency and Time forum,* 2009, pp. 40-43.

[16] E. a. Nichols, H. F. Morrison, and J. Clarke, "Signals and Noise in Measurements of Low-Frequency Geomagnetic Fields," *J. Geophys. Res.*, vol. 93, no. B11, p. 13743, 1988.

[17] Y. Zhou and M. Y. W. Chia, "A low-power ultrawideband CMOS true RMS power detector," *IEEE Trans. Microw. Theory Tech.*, vol. 56, no. 5, pp. 1052-1058, 2008.

[18] R. Li, B. Pan, J. Laskar, and M. M. Tentzeris, "A Novel Low-Profile Broadband Dual-Frequency Planar Antenna for Wireless Handsets," *IEEE Trans. Antennas Propag.*, vol. 56, no. 4, pp. 1155-1162, 2008.

[19] S. Nichols, "Advanced Antenna Measurement System Architectures," in *AMTA 33th Annual Meeting and Symposium,* 2011.

[20] http://www.standa.lt/products.

What is claimed is:

1. A computer-implemented method for adaptive near-field data acquisition comprising:
   a) measuring at least one of an amplitude and phase of at least one of a magnetic field and an electric field over a surface using one or more probes, wherein the measuring is performed at a plurality of points at one or more predetermined heights and a plurality of locations in proximity to a device under test, wherein each point corresponds to a predefined area, and wherein all of the predefined areas define the measurement plane;
   b) selecting, for each point of the plurality of points, a set of neighboring points;
   c) in order to obtain an initial near-field data resolution, for each point of the plurality of points using said set of neighboring points for said each point, calculating a field variation to determine a presence of a strongly varying near-field pattern;
   d) for each location corresponding to each point of the plurality of points where a strongly varying near-field pattern is determined, inserting one or more new points, wherein each point of said one or more new points corresponds to a predefined sub-area, and wherein all of the predefined sub-areas define said each location where a near-field variation is determined; and
   e) for each of said one or more new points, calculating a field variation to determine a presence of strongly varying near-field pattern, providing increased near-field resolution for said each location.

2. The method as defined in claim 1, wherein said one or more probes is an array of probes.

3. The method as defined in claim 1, wherein each point of the plurality of points is at a center of the corresponding predefined area.

4. The method as defined in claim 1, wherein at least one of:
   the near-field data may be acquired at multiple frequencies; and
   the near-field data may be acquired in a frequency band.

5. The method as defined in claim 1, wherein said plurality of points define a plane in proximity to a surface of said device under test.

6. The method as defined in claim 1, wherein Voroni Tessellations are used to generate the predefined areas as a function of the surface.

7. The method as defined in claim 5, wherein said surface is curved.

8. The method as defined in claim 1, wherein the adaptive near-field data acquisition is used to evaluate or calibrate a device under test.

9. The method as defined in claim 8, wherein the device under test comprises an antenna, and wherein the adaptive near-field data acquisition is used to calculate one or more parameters of the antenna, wherein said parameters consist of gain and directivity.

10. The method as defined in claim 1, wherein said measuring comprises the measuring of the amplitude of the at least one of the magnetic field and the electric field.

11. The method as defined in claim 1, further comprising, after e), verifying a convergence of said measured near-field data, and terminating the sampling process following said verifying.

12. The method as defined in claim 1, wherein said selecting a set of neighboring points is performed using N-dimensional cross-polytope configuration.

13. The method as defined in claim 1, wherein said calculating a field variation comprises calculating power variation of the at least one of a magnetic field and an electric field.

14. The method as defined in claim 1, further comprising performing a spectral-spatial scan of the device under test using said near-field data.

15. The method as defined in claim 1, wherein said one or more probes are inserted in a dielectric.

16. The device under test that has been tested using the near-field data generated using the method as defined in claim 1.

17. The device as defined in claim 16, wherein said device comprises an antenna.

18. Non-transitory memory comprising program code that, when executed by a processor, causes the processor to:
   a) measure at least one of an amplitude and phase of at least one of a magnetic field and an electric field over a surface using one or more probes, wherein the measuring is performed at a plurality of points at one or more predetermined heights and a plurality of locations in proximity to a device under test, wherein each point corresponds to a predefined area, and wherein all of the predefined areas define the measurement plane;
   b) select, for each point of the plurality of points, a set of neighboring points;
   c) in order to obtain an initial near-field data resolution, for each point of the plurality of points using said set of neighboring points for said each point, calculate a field variation to determine a presence of a strongly varying near-field pattern;
   d) for each location corresponding to each point of the plurality of points where a strongly varying near-field pattern is determined, insert one or more new points, wherein each point of said one or more new points corresponds to a predefined sub-area, and wherein all of the predefined sub-areas define said each location where a near-field variation is determined; and
   e) for each of said one or more new points, calculate a field variation to determine a presence of strongly varying near-field pattern, providing increased near-field resolution for said each location.

19. A device testing chamber system comprising:
   one or more probes that are at least one of magnetic and electric;
   a chamber for receiving a device under test;
   a processor; and
   the non-transitory memory as defined in claim 18.

20. The chamber system as defined in claim 19, wherein the memory further contains program code that, when executed by the processor, causes the processor to remove disruption caused by at least one of the chamber and a disruptive object from the acquired near-field data.

* * * * *